(12) United States Patent
Mihota

(10) Patent No.: US 6,623,187 B1
(45) Date of Patent: Sep. 23, 2003

(54) WIRELESS OPTICAL COMMUNICATION SYSTEM AND WIRELESS OPTICAL COMMUNICATION METHOD

(75) Inventor: Norihito Mihota, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/518,919

(22) Filed: Mar. 6, 2000

(30) Foreign Application Priority Data

Mar. 4, 1999 (JP) ............................. P11-057756

(51) Int. Cl.[7] ................ H04B 10/04; H04B 10/10; H04J 14/02
(52) U.S. Cl. ............... 398/118; 398/99; 398/167.5; 398/58; 398/180; 370/330
(58) Field of Search ................ 359/187, 110, 359/161, 180, 135; 370/330, 478; 375/268, 269, 300, 301

(56) References Cited

U.S. PATENT DOCUMENTS 4,166,212 A * 8/1979 Judeinstein ............. 359/140
6,067,325 A * 5/2000 Carter, IV ............. 375/283
6,330,451 B1 * 12/2001 Sen et al. ............. 455/452

* cited by examiner

Primary Examiner—Leslie Pascal
Assistant Examiner—Sherif R. Fahmy
(74) Attorney, Agent, or Firm—Jay H. Maioli

(57) ABSTRACT

A wireless optical communication system can reduce the power consumption needed for light emission by a controlled node and suppress a modulated signal component, other than the modulated signal of input data for transmission, in the modulated signal components carried by the light output of the controlled node. The controlled node includes a transmission device for transmitting input data for transmission by an infrared ray amplitude-modulated by a modulated signal of a first frequency band and a light emission control device for suspending the light emission by the transmission device for a predetermined period based on a data amount of the input data for transmission. The light emission circuit generates a light emission control signal and the transmission device stops or starts the light emission based on the light emission control signal so that the modulated signal component in the second frequency band other than the first frequency band does not exceed a maximum allowable value.

59 Claims, 20 Drawing Sheets

WIRELESS OPTICAL COMMUNICATION SYSTEM AND WIRELESS OPTICAL COMMUNICATION METHOD

BACKGROUND OF THE INVENTION

1. Field of the Invention

The present invention relates to an optical communication system and a wireless optical communication method used in the technical field of wireless communication using infrared and other light.

2. Description of the Related Art

In the field of wireless communication using infrared ray, the International Electrotechnical Commission (IEC) and, in Japan, the Electronic Industries Association of Japan (EIAJ) assign sub-carrier frequency hands.

There are various optical communication devices for unwired communication using infrared rays. For example, there are remote controls for remote control of television sets, video cassette recorders, etc. using infrared rays, cordless headphones receiving audio signals etc. by wireless communication using infrared rays from audio players, etc.

The sub-carrier frequency band assigned for use in infrared communication in a remote control is 33 kHz to 40 kHz (specifically, not less than 33 kHz and less than 40 kHz), while the sub-carrier frequency band assigned for use in transmission of audio signals in the above cordless headphones etc. 2 MHZ to 6 MHZ (specifically, not less than 2 MHZ and less than 6 MHZ).

Here, as shown in FIG. 18, assume an infrared optical communication system which comprises one control node (device) 200 and a plurality of controlled nodes 260, for example, three controlled nodes 260A to 260C. Also, as shown in FIG. 19, assume that the optical communication system performs optical communication by the time-division multiplex system.

In FIG. 18 and FIG. 19, a control block B1 is used for transmitting control information from a control node 200 to the controlled nodes.

The control block B1 is periodically transmitted. A plurality of time slots SL (four time slots SL1 to SL4 in the example shown in FIG. 19) are provided between one control block and the next control block.

The nodes transmit data by sending transfer blocks B2 (transfer blocks B2A, B2B, and B2C in the example shown in FIG. 19) in the time slots (communication time slot) SL.

As shown in FIG. 20, part of the above control block B1 is used as an enabling signal (transmission-enablng signal) indicating information on the assignment of the time slots and indicating approval of use of the time slots SL. The control node 200 transmits the enabling signal to the controlled nodes 260.

In the example of FIG. 19 and FIG. 20, referring to the enabling signal in the control block B1, first the controlled node 260A transfers a transfer block (communication block) B2A to the control node 200. Next, the control node 200 transfers the transfer block B2B to all of the controlled nodes 260. Then, the controlled node 260C transfers the transfer block B2C to the control node 200.

This optical communication system uses a wide band for attaining high speed communication. Further, to enable use without interfering with remote controls, cordless headphones, and other systems, it uses a sub-carrier frequency of not less than 6 MHZ and less than 60 MHZ (or not less than 6 MHZ and less than 50 MHZ) shown by the hatched portion in FIG. 21.

FIG. 22 is a schematic block diagram for explaining the configuration of the control node 200 and the controlled nodes 260.

In FIG. 22, the control node 200 comprises a transmission device (transmitter) 210 and a reception device (receiver) 220. A controlled node 260 comprises a transmission device (transmitter) 240 and a reception device (receiver) 250.

The transmission device 210 of the control node 200 comprises a quadrature modulation circuit 211 and a light emission circuit 212, while the reception device 220 comprises a light reception circuit 221 and a quadrature demodulation circuit 222.

Similarly, the transmission device 240 of a controlled node 260 comprises a quadrature modulation circuit 241 and a light emission circuit 242, while the reception device 250 comprises a light reception circuit 251 and a quadrature demodulation circuit 252.

The quadrature modulation circuit 211 of the control node 200 modulates a transmission signal S201 and outputs a modulated signal (carrier modulated signal) S202 composed of a frequency component of not more than 6 MHZ and less than 60 MHZ (or not less than 6 MHZ and less than 50 MHZ). The modulated signal S202 is input to the light emission circuit 212.

The light emission circuit 212 performs amplitude modulation on infrared rays based on the modulated signal S202. Namely, the light emission circuit 212 comprises a light emitting diode for emitting an infrared ray and drives the light emitting diode based on the modulated signal S202. As a result, an infrared ray S203 which is amplitude-modulated based on the modulated signal S202 is output from the light emission circuit 212.

On the other hand, the reception device 250 of the controlled node 260 receives the infrared ray S203 output from the control node 200 at the reception circuit 251. Namely, the light reception circuit 251 comprises a photodiode which receives the infrared ray S203 and converts it to an electric signal. Also, the reception circuit 251 has, for example, a high-pass filter which cuts a low frequency component such as the direct current component of the electric signal. An output signal S204 of the reception circuit 251 is input to the quadrature demodulation circuit 252.

The quadrature demodulation circuit 252 performs quadrature demodulation on the signal S204 to reproduce a reception signal S205 the same as the transmission signal S201.

Note that the transmission device 240 of the controlled node 260 has the same configuration as the transmission device 210 of the control node 200, and the reception device 220 of the control node 200 has the same configuration as the reception device 250 of the controlled node 260.

Namely, the quadrature modulation circuit 241 of the controlled node 260 modulates a transmission signal S211 and outputs a modulated signal S212 composed of a frequency component of not less than 6 MHZ and less than 60 MHZ (or not less than 6 MHZ and less than 50 MHZ). The light emission circuit 242 performs amplitude modulation on an infrared ray based on the modulated signal S212. As a result, an infrared ray S213 amplitude-modulated based on the modulated signal S212 is output from the light emission circuit 242.

On the other hand, the reception device 220 of the control node 200 receives the infrared ray from the controlled node 260 at the light reception circuit 221, converts it into an electric signal, and cuts the direct current component of the electric signal. It performs quadrature modulation on the output signal S214 of the reception circuit 221 to reproduce a reception signal S215 the same as the transmission signal S211.

The emission intensity (amplitude) of the infrared ray S203 amplitude-modulated based on the modulated signal S202 is shown as an example in FIG. 23. In FIG. 23, a control block B1 and a transfer block B2B transmitted by the control node 200 are shown.

The transfer block B2B is transferred in a time slot SL2.

Summarizing the disadvantages of the above system, when performing high speed wireless communication using an infrared ray as explained above, there are the following disadvantages in the transmission device for emitting the infrared ray:

Since the light emission circuit of the above transmission device produces an amplitude-modulated infrared ray as explained above, as shown in FIG. 23, it constantly emits an infrared ray of a certain level (having a signal strength) even when there is no transmission signal. Namely, even a node which for example transmits once in 1000 cycles constantly emits an infrared ray. Therefore, it emits a wasted infrared ray in the remaining 999 cycles. As a result, the power consumption of the transmission device becomes large.

By modifying the output level of the infrared ray shown in FIG. 23 to be as shown in FIG. 24 and by making the transmission device emit the infrared ray only when there is a transmission signal (when performing actual transmission), the power consumption can be suppressed.

However, in the power-saving method shown in FIG. 24, if the periods of the time slots are made shorter for higher speed communication, the modulated signal component of a sub-carrier frequency band of for example not less than 33 kHz and less than 6 MHZ is increased in the modulated signal components carried by the modulated wave, that Is, the infrared ray, a serious spurious wave is generated.

As a result, the components in the frequency band of the infrared rays emitted from remote controls and other existing infrared communication devices undesirably increase in the frequency components of the infrared ray emitted from the transmission device.

SUMMARY OF THE INVENTION

An object of the present invention is to provide a wireless optical communication system for performing optical communication between a plurality of nodes using light amplitude-modulated by a modulated signal of a first frequency band which can reduce the power consumption for light emission in the nodes and suppress modulated signal components other than the first frequency band among modulated signal components carried by the light, and a wireless optical communication method for the same.

According to a first aspect of the present invention, there is provided a first wireless optical communication system comprising a plurality of nodes including a first and second nodes and performing optical communication at least between the first node and the second node, wherein the second node comprises a transmission means for transmitting input data for transmission to be input to the second node to the first node by using light amplitude-modulated by a modulated signal of a first frequency band and a light emission control means for suspending light emission by the transmission means for a predetermined period based on a data amount of the input data for transmission to be input to the second node so that a modulated signal component in the second frequency band other than the first frequency band does not exceed a maximum allowable value.

According to a second aspect of the present invention, there is provided a first wireless optical communication method for performing optical communication at least between a first node and a second node among a plurality of nodes, including the steps of transferring input data for transmission to be input to the second node from the second node to the first node by using light amplitude-modulated by a modulated signal of a first frequency band; detecting a data amount of the input data for transmission to be input to the second node; and suspending light emission by the second node for a predetermined period based on the detected data amount so that a modulated signal component in a second frequency band other than the first frequency band does not exceed a maximum allowable value.

According to a third aspect of the present invention, there is provided a second wireless optical communication system comprising a plurality of nodes including a first and second nodes and performing optical communication at least between the first node and second node, wherein the first node comprises a first reception means for receiving light from the second node and extracting from the light data from the second node; an instruction information generation means for generating instruction information to stop light emission by the second node for a predetermined period based on amount information In the data extracted in the first reception means; and a first transmission means for transmitting the instruction information to the second node by using light amplitude-modulated by a modulated signal of a first frequency band; and the second node comprises a reception means for receiving light from the first node and extracting from the light the instruction information; an amount information generation means for generating amount information of input data for transmission to be input to the second node; a second transmission means for transmitting the amount information generated by the amount information generation means to the first node by using light amplitude-modulated by a modulated signal of the first frequency band; and a light emission control means for suspending light emission by the second transmission means based on the instruction information extracted by the second reception means so that a modulated signal component in a second frequency band other than the first frequency band does not exceed a maximum allowable value.

According to a fourth aspect of the present invention, there is provided a third wireless optical communication system comprising a plurality of nodes including a first and second nodes and performing optical communication at least between the first node and second node, wherein the first node comprises a first transmission means for transmitting to the second node first input data for transmission to be input to the first node by using light amplitude-modulated by a modulated signal of a first frequency band; a first reception means for receiving light from the second node and extracting from the light data from the second node; and a light emission control means for suspending light emission by the first transmission means based on amount information in the data extracted in the first reception means and data amount of the first input data for transmission to be input to the first node so that a modulated signal component in a second frequency band other than the first frequency band does not exceed a maximum allowable value; and the second node comprises an amount information generation means for generating amount information of second input data for transmission to be input to the second node and a second transmission means for transmitting the amount information generated by the amount information generation means to the first node by using light amplitude-modulated by a modulated signal of the first frequency band.

According to a fifth aspect of the present invention, there is provided a second wireless optical communication method for performing optical communication at least between a first node and a second node among a plurality of nodes, including the steps of transferring first input data for transmission to be input to the first node from the first node to at least the second node by using light amplitude-modulated by a modulated signal of a first frequency band; generating amount information of second input data for transmission to be input to the second node in the second node; transferring the amount information from the second node to the first node by using light amplitude-modulated by a modulated signal of the first frequency band; and suspending light emission by the first node for a predetermined period based on the amount information transferred from the second node and a data amount of the first input data for transmission to be input to the first node so that a modulated signal component in a second frequency band other than the first frequency band does not exceed a maximum allowable value.

In the first optical communication system according to the present invention, the light emission control means of the second node suspends light emission of the transmission means of the second node for a predetermined period based on the data amount of input data for transmission to be input to the second node.

The transmission means of the second node suspends light emission for a predetermined period by stopping and starting light emission so that modulated signal component in the second frequency band becomes under a maximum allowable value.

As a result, the light emission of the transmission means can be suspended for a predetermined period in accordance with the data amount of the input data for transmission, and the power consumption for the light emission by the transmission means can be reduced.

Further, the modulated signal component of the second frequency band generated by the stopping and starting of light emission in the modulated signal components carried by the modulated wave, that is, the light, can be kept under a maximum allowable value.

In the second optical communication system according to the present invention, the instruction information generation means of the first node generates instruction information for suspending the light emission by the second transmission means of the second node for a predetermined period based on the data amount of input data for transmission to be input to the second node.

The light emission control means of the second node suspends the light emission by the second transmission means for a predetermined period of time based on the instruction information transmitted from the first node.

The second transmission means suspends the light emission for a predetermined period by stopping and starting light emission so that modulated signal component in the second frequency band becomes under a maximum allowable value.

As a result, the light emission by the second transmission means can be suspended for a predetermined period in accordance with the data amount of the input data for transmission, and the power consumption for light emission by the transmission means can be reduced.

Further, the modulated signal component of the second frequency band generated by the stopping and starting of light emission in the modulated signal components carried by the modulated wave, that is, the light, can be kept under a maximum allowable value.

In the third optical communication system according to the present invention, the light emission control means of the first node suspends the light emission by the first transmission means of the first node for a predetermined period based on the data amount of the input data for the first transmission to be input to the first node and the data amount of the input data for the second transmission to be input to the second node.

The first transmission means suspends the light emission for a predetermined period by stopping and starting the light emission so that the modulated signal component in the second frequency band becomes under a maximum allowable value.

As a result, the light emission by the first transmission means can be suspended for a predetermined period in accordance with the data amounts of the input data for the first and second transmission, and the power consumption for the light emission by the transmission means can be reduced.

Further, the modulated signal component of the second frequency band generated by the stopping and starting of light emission in the modulated signal components carried by the modulated wave, that is, the light, can be kept under a maximum allowable value.

In the first optical communication method according to the present invention, the second node suspends the light emission for a predetermined period based on the data amount of the input data for transmission to be input to the second node so that the modulated signal component in the second frequency band becomes under a maximum allowable value.

As explained above, the light emission by the second node can be suspended for a predetermined period in accordance with the data amount of the input data for transmission, and the power consumption for the light emission by the second node can be reduced.

Further, the modulated signal component of the second frequency band generated by the stopping and starting of light emission in the modulated signal components carried by the modulated wave, that is, the light, can be kept under a maximum allowable value.

In the second optical communication method according to the present invention, the first node suspends the light emission for a predetermined period based on the data amount information of the input data for second transmission to be input to the second node and the data amount of input data for first transmission to be input to the first node so that the modulated signal component of the second frequency band becomes under a maximum allowable value.

As explained above, the light emission by the first node can be suspended for a predetermined period in accordance with the data amounts of the input data for the first and second transmission, and the power consumption for the light emission by the first node can be reduced.

Further, the modulated signal component of the second frequency band generated by the stopping and starting of light emission in the modulated signal components carried by the modulated wave, that is, the light, can be kept under a maximum allowable value.

BRIEF DESCRIPTION OF THE DRAWINGS

These and other objects and features of the present invention will become clearer from the following description of the preferred embodiments with reference to the accompanying drawings, in which.

DESCRIPTION OF THE PREFERRED EMBODIMENTS

Below, preferred embodiments will be described with reference to the accompanying drawings.

Figure 18:
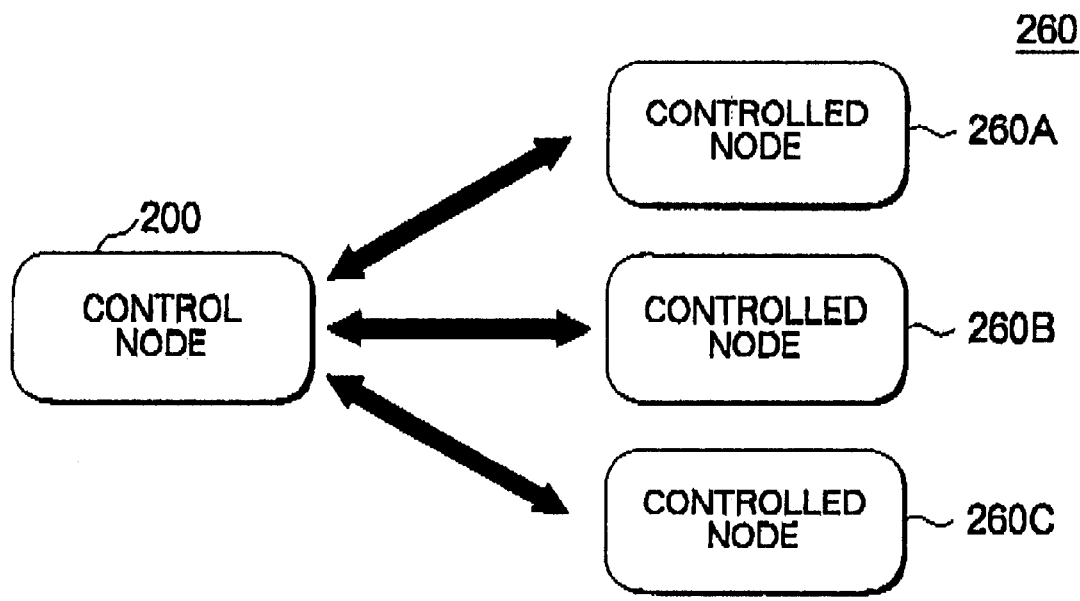
FIG. 18 is a view of an example of the configuration of a wireless optical communication system using a control node and a plurality of controlled nodes.

As embodiments of application of a wireless optical communication method and a wireless optical communication system according to the present invention, assume, for example, a high speed infrared optical communication system which comprises one control node and a plurality of controlled nodes as shown in FIG. 18.

Figure 19:
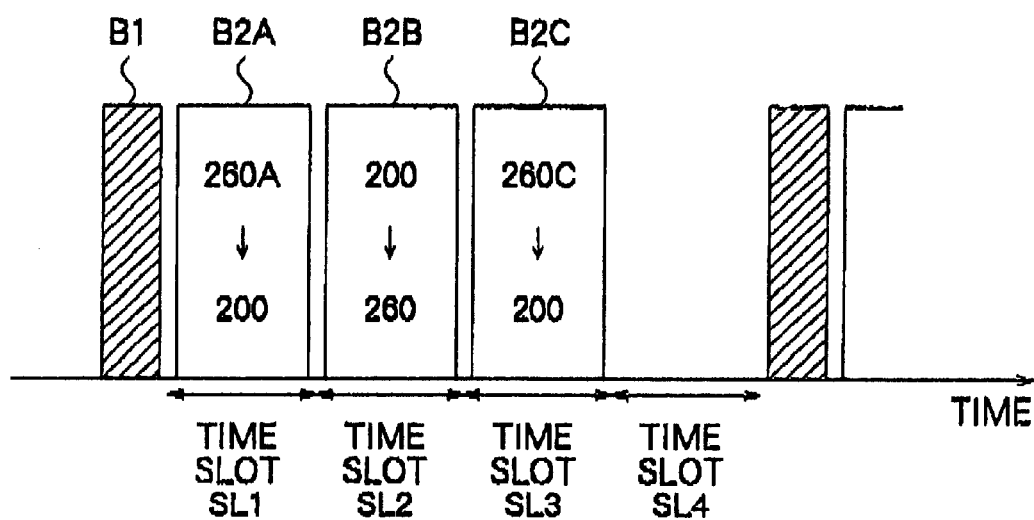
FIG. 19 is a view of the time assignment in a wireless optical communication system.
Figure 20:
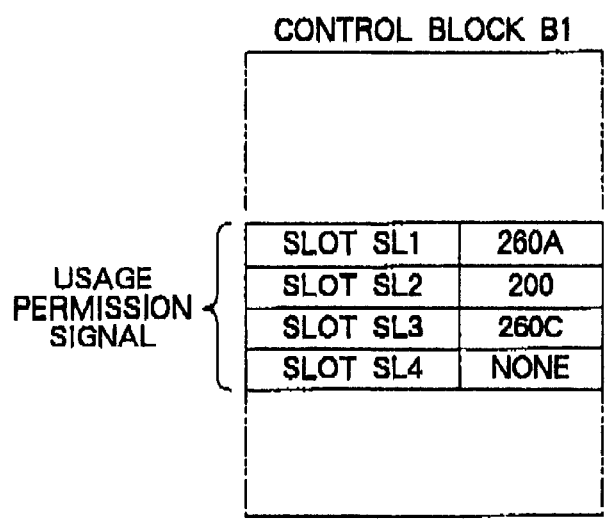
FIG. 20 is a view of an enabling signal of a time slot existing in a control block.

Also, in the wireless optical communication system according to the embodiments of the present invention, assume that optical communication of a time-division multiplex system as shown in FIG. 19 is performed. Thus, in the embodiments of the present invention, as shown in FIG. 20, part of the control block is used as an enabling signal (transmission enabling signal) indicating information of assignment of time slots and approval for using the time slots.

Figure 21:
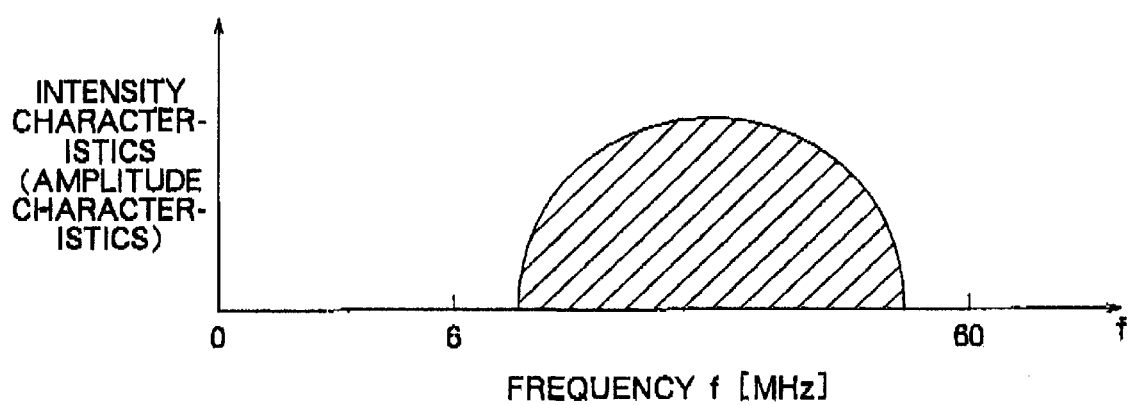
FIG. 21 is a view of a transmission frequency band of a wireless optical communication system.
Figure 22:
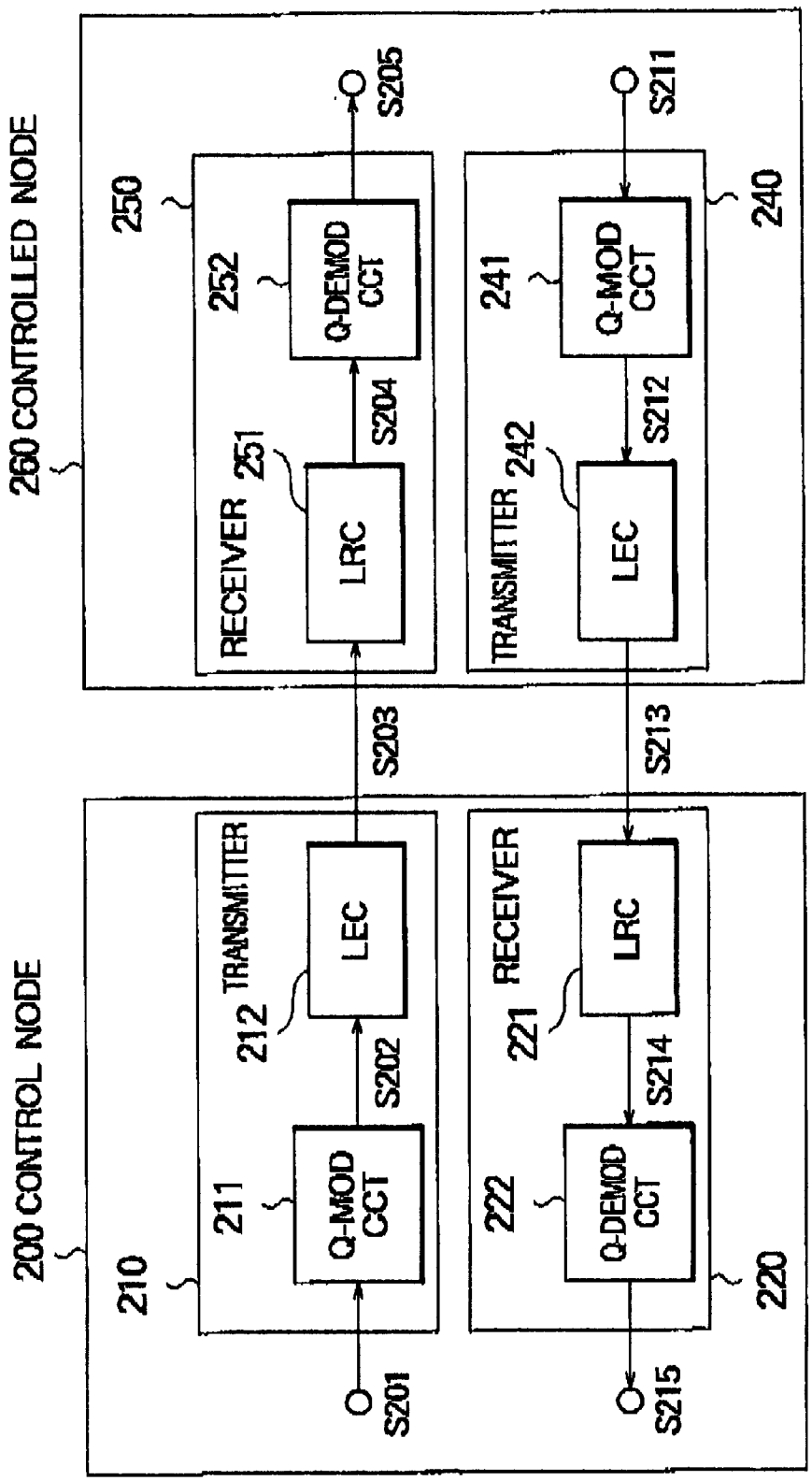
FIG. 22 is a schematic block diagram of the configuration of a control node and a controlled node included in a wireless optical communication system of the related art.
Figure 23:
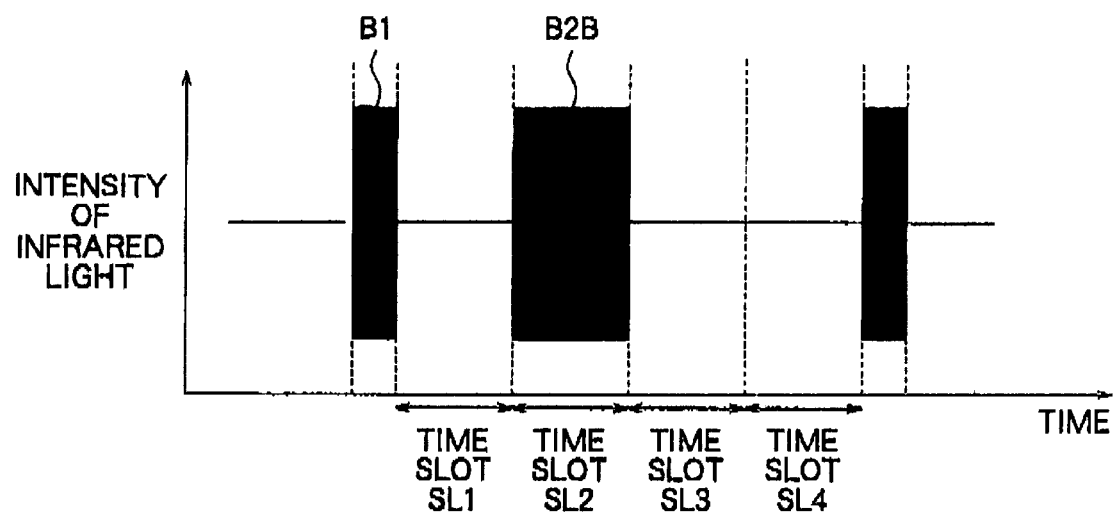
FIG. 23 is a view of an example of a signal strength of an infrared ray output from a control node of the related art.
Figure 24:
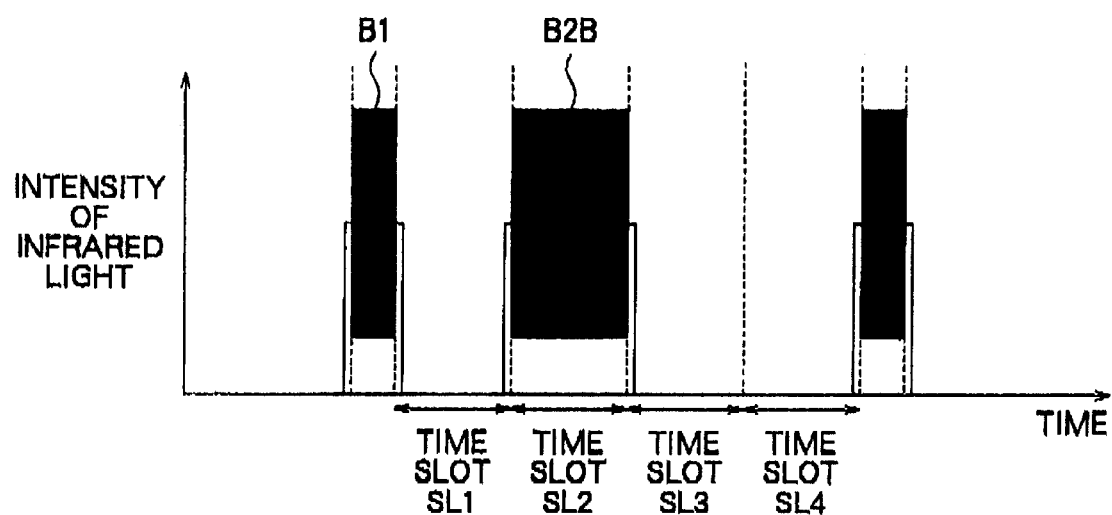
FIG. 24 is a view of an example of a signal strength of an infrared ray output from a control node.

Further, in the optical communication system according to the embodiments of the present invention, assume that a broad frequency band is used for realizing high speed communication and that optical communication is performed by using a sub-carrier frequency of not less than 6 MHZ and less than 60 MHZ (or not more than 6 MHZ and less than 50 MHZ) as shown in FIG. 21 in order to avoid interference with remote controls, cordless headphones, and other infrared communication devices.

First Embodiment

Figure 1:
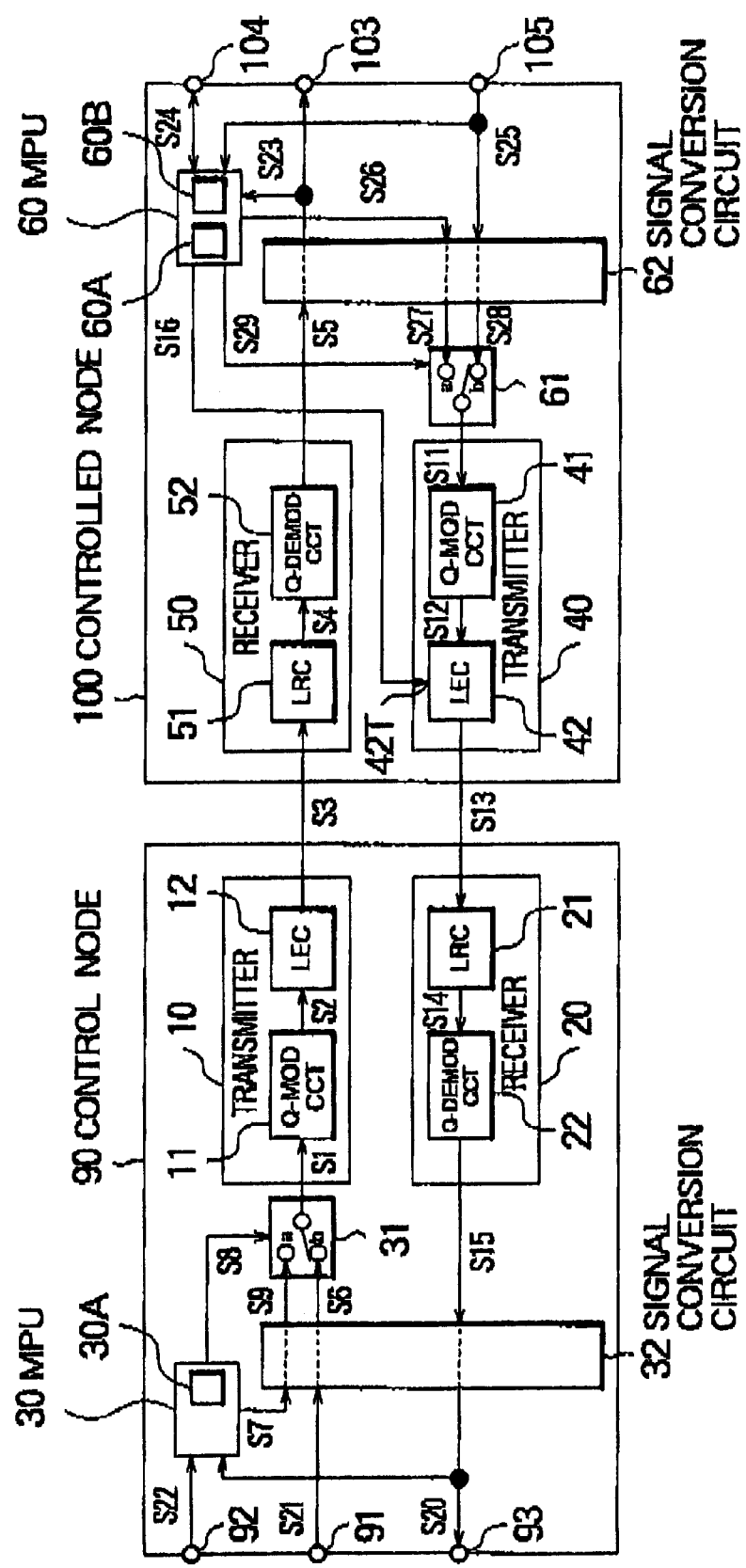
FIG. 1 is a schematic block diagram of the configuration of a control node and a controlled node included in a wireless optical communication system according to a first embodiment of the present invention.

FIG. 1 is a schematic block diagram of the configuration of a control node (a first node) 90 and a controlled node (a second node) 100 used in a wireless optical communication system of a first embodiment of the present invention.

Note that in FIG. 1, for simplification, the number of the control node 90 is made one and the number of the controlled nodes is also made one, thereby giving an example of one-to-one optical communication, however, the invention can be applied to one-to-many optical communication as well.

The control node 90 comprises a transmission device (transmitter) 10, a reception device (receiver) 20, a microprocessing unit (MPU) 30, a switch 31, and a signal conversion circuit 32.

The transmission device 10 and the switch 31 comprise a transmission means, while the reception device 20 and the signal conversion circuit 32 comprise a reception means.

The transmission device 10 comprises a quadrature modulation circuit 11 and a light emission circuit 12. The light emission circuit 12 is made to constantly emit an infrared ray. The light emission circuit 12 has a light emitting diode to emit the infrared ray.

The reception device 20 comprises a light reception circuit 21 and a quadrature demodulation circuit 22. The light reception circuit 21 comprises a photodiode and a high-pass filter (HPF). The high-pass filter cuts a low frequency component such as the direct current component of an electric signal output from the photodiode and passes a high frequency component.

The MPU 30 is a controller in overall control of the control node 90 and has an assignment means 30A.

The assignment means 30A assigns time slots, generates assignment information, and outputs a signal (enabling signal) S7 indicating the assignment information to the signal conversion circuit 32.

The controlled node 100 comprises a transmission device (transmitter) 40, a reception device (receiver) 50, an MPU 60, a switch 61, and a signal conversion circuit 62.

The transmission device 40 and the switch 61 comprise a transmission means, while the reception device 50 and the signal conversion circuit 62 comprise a reception means.

The transmission device 40 comprises a light emission circuit 42 and a quadrature modulation circuit 41. The light emission circuit 42 is made to emit light based on a light emission control signal S16 input to a light emission control terminal 42T. The light emission circuit 42 has a light emitting diode for emitting an infrared ray.

Note that the light emission circuit 42 has the same configuration as that of the light emission circuit 12. The not illustrated light emission control terminal of the light emission circuit 12 is designed to be supplied with a light emission control signal to make the light emission circuit 12 constantly emit light.

The reception device 50 comprises a light reception circuit 51 and a quadrature demodulation circuit 52. The light reception circuit 51 comprises a photodiode and a high-pass filter (HPF). The high-pass filter cuts the direct current component of an electric signal output from the photodiode.

The MPU 60 is a controller for overall control of the controlled node 100 and comprises a light emission control means 60A and an amount information generation means 60B.

The light emission control means 60A generates a light emission control signal S16 and outputs it to the light emission circuit 42.

The amount information generation means 60B monitors input data for transmission (input data) S25, generates amount information of the input data S25, and supplies the amount information to the light emission control means 60A.

Data is transferred from the control node 90 to the controlled node 100 by the following processing.

The input data for transmission (input data) S21 is supplied to a terminal 91 of the control node 90. The input data S21 is then input to the signal conversion circuit 32.

The signal conversion circuit 32 converts the input data S21 to a signal S6 of a format for infrared communication. The signal S6 is supplied to the quadrature modulation circuit 11 as a transmission signal S1 via the switch 31.

The quadrature modulation circuit 11 modulates the transmission signal S1 to generate a modulated signal (carrier modulated signal) S2 comprised by a frequency component of not less than 6 MHZ and less than 60 MHZ.

The carrier modulated signal S2 is input to the light emission circuit 12. The light emission circuit 12 outputs an infrared ray S3 amplitude-modulated based on the carrier modulated signal S2.

In the reception device 50 of the controlled node 100, the infrared ray S3 is received by the light reception circuit 51.

The light reception circuit 51 converts the infrared ray S3 into an electric signal and generates a signal S4 in which the direct current component is cut.

The signal S4 is input to the quadrature demodulation circuit 52. The quadrature demodulation circuit 52 performs quadrature demodulation on the signal S4 to reproduce a reception signal S5 the same as the transmission signal S1.

The reception signal S5 is input to the signal conversion circuit 62. The signal conversion circuit 62 performs the reverse signal processing as the signal processing for converting the input data S21 to the signal S6 in the signal conversion circuit 32 so as to invert it and generates output data S23 which it outputs to the MPU 60 and the terminal 103. The output data S23 includes the input data S21 or the signal S7.

On the other hand, data is transferred from the controlled node 100 to the control node 90 by similar processing.

Input data S25 is supplied to a terminal 105 of the controlled node 100. The input data S25 is input to the signal conversion circuit 62 and the MPU 60.

The signal conversion circuit 62 converts the input data S25 into a signal S28 of a format for infrared communication. The signal S28 is input to the quadrature modulation circuit 41 as a transmission signal S11 via the switch 61.

The quadrature modulation circuit 41 modulates the transmission signal S11 and generates a modulated signal (carrier modulated signal) S12 comprised by a frequency component of not more than 6 MHZ and less than 60 MHZ.

The carrier modulated signal S12 is input to the light emission circuit 42. The light emission circuit 42 outputs an infrared ray S13 amplitude-demodulated based on the carrier modulated signal S12.

In the reception device 20 of the control node 90, the infrared ray S13 is received by the light reception circuit 21.

The light reception circuit 21 converts the infrared ray S13 into an electric signal and generates a signal S14 where the direct current component is cut.

The signal S14 is input to the quadrature demodulation circuit 22. The quadrature demodulation circuit 22 performs quadrature demodulation on the signal S14 to reproduce a reception signal S15 the same as the above transmission signal S11.

The reception signal S15 is input to the signal conversion circuit 32. The signal conversion circuit 32 performs the reverse signal processing as the signal processing for converting the input data S25 to the signal S28 in the signal conversion circuit 62 so as to invert it and generates output data S20 which it outputs to the MPU 30 and the terminal 93. The output data S20 includes the input data S25 or the signal S26.

The assignment means 30A included in the MPU 30 of the control node 90 assigns time slots after N cycles (N≧1) to generate a signal S7 indicating assignment information based on an instruction signal S22 input from the outside, such as an upper layer, to the terminal 92 or the output data S20.

Note that while it was explained that the assignment means 30A assigns slots based on the instruction signal S22, the assignment means 30A may be provided with a counter, a memory device, etc. and use these so that the assignment means 30A autonomously assigns slots and generates the signal S7.

The signal S7 is converted into a signal S9 of a format for infrared communication in the signal conversion circuit 32. The signal S9 is supplied to a switchable terminal a of the switch 31.

The switch 31 receives a transfer block or a control block from the signal conversion circuit 32 as a signal S6 at another switchable terminal b and controls the switching of the switchable terminals a and b based on a switch control signal S8 from the MPU 30.

When transmitting an ordinary transfer block, the MPU 30 controls the switch 31 to switch to the switchable terminal b side by the switch control signal S8 so that the signal S6 of the transfer block is transferred as it is as a signal S1 to the transmission device 10.

When transmitting a control block, the MPU 30 controls the switch 31 to switch the switchable terminals a and b by a switch control signal S8 so that the signal S9 is inserted into part of the control block. Here, the switch 31 operates as a multiplexer. As a result, a transmission signal S1 having the configuration shown in FIG. 20 where the signal S9 is inserted in part of the signal S6 of the control block is generated At this time, the signal S9 inserted in the control block is a signal indicating assignment information of time slots after N cycles and approval of use of the time slots.

On the other hand, the light emission control means 60A in the MPU 60 of the controlled node 100 is supplied with output data S23 from the signal conversion circuit 62 and detects the control block.

The amount information generation means 60B in the MPU 60 generates information of a data amount (amount information) of input data S25 and supplies it to the light emission control means 60A.

The light emission control means 60A refers to the signal S7 in the control block and decides the stopping of the emission of an infrared ray, emission restarting time S, etc. based on the amount information from the amount information generation means 60B.

Then, the light emission control means 60A controls the light emission of the light emission circuit 42 by a light emission control signal S16 to make stop and start emission of the infrared ray. Further, light emission suspension information including information indicating emission stopping and information indicating an emission restarting time S is output as a signal S26 to the signal conversion circuit 62. Note that the light emission suspension information may be information indicating timings of stopping and starting the light emission, patterns, or transient characteristics.

The signal conversion circuit 62 converts the signal S26 into a signal S27 of a format for infrared communication and supplies the same to one switchable terminal a of the switch 61.

The switch 61 is supplied with a transfer block from the signal conversion circuit 62 as a signal S28 at the other switchable terminal b and controls the switching of the switchable terminals a and b by the switch control signal S29 from the MPU 60.

The MPU 60 switches the switch 61 by the switch control signal S29 to insert the signal S27 to part of the signal S28 of the transfer block. The transmission signal S11 of the transfer block is output from the switch 61 to the transmission device 40.

Operation of Controlled Node 100

Next, the operation of the controlled node 100 will be explained with reference to FIG. 2 and FIG. 3.

Figure 2:
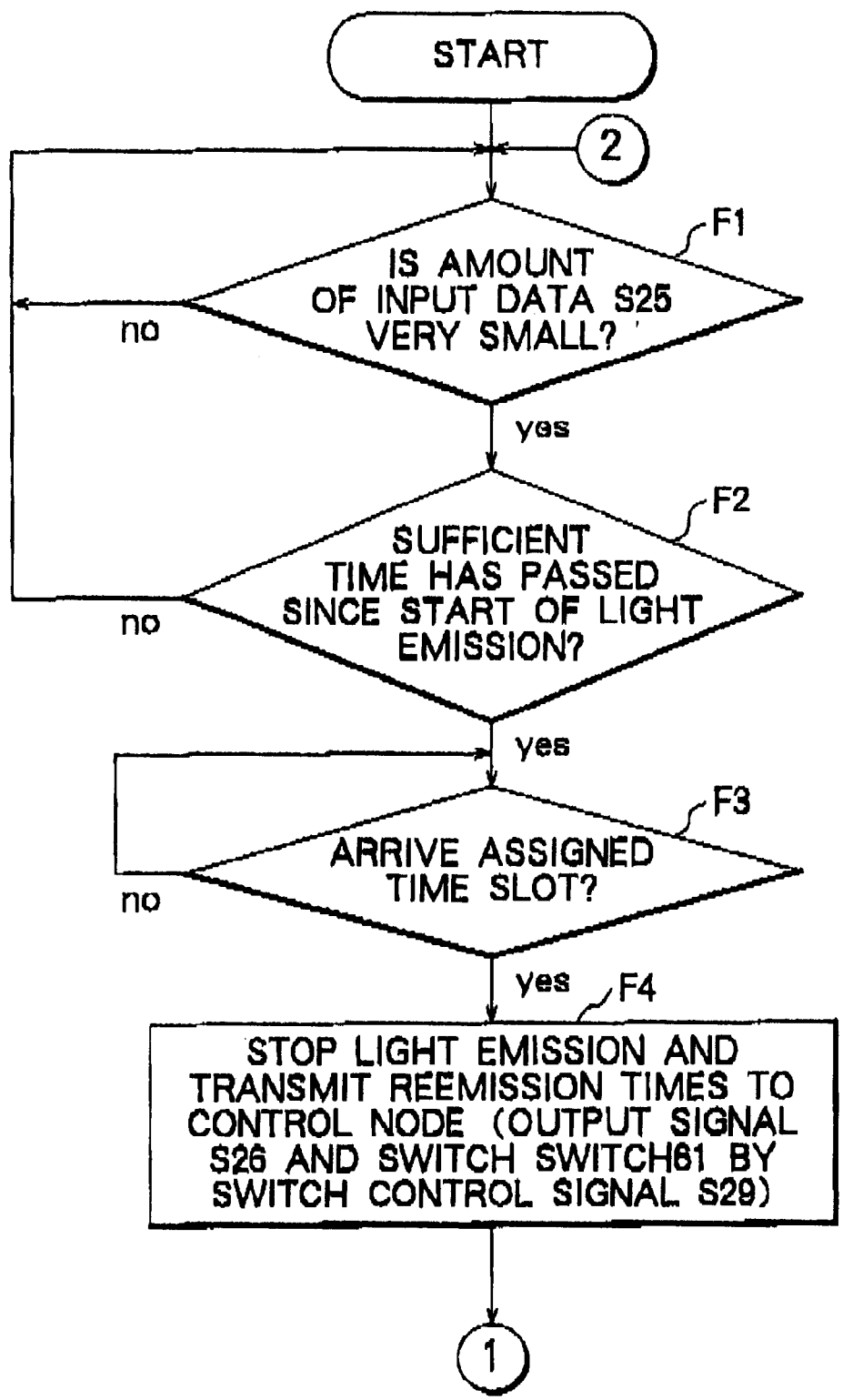
FIG. 2 is a schematic flow chart of the operation of a controlled node and a control operation of an MPU.
Figure 3:
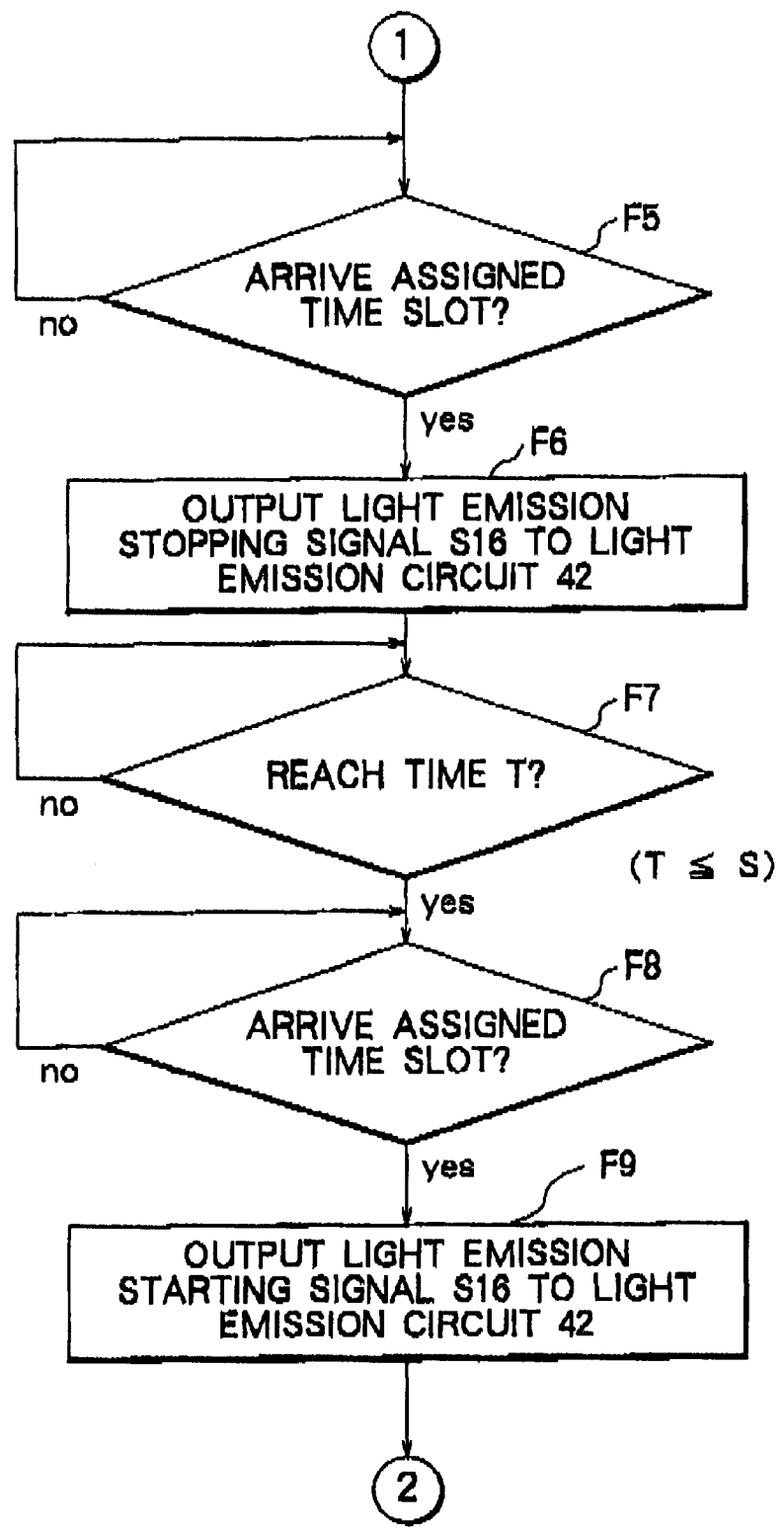
FIG. 3 is a schematic flow chart of the operation of the controlled node and the control operation of the MPU continued from FIG. 2.

FIGS. 2 and 3 are schematic flow charts of the operation of the controlled node 100 and the control operation of the MPU 60. Here, the control operation relating to the stopping and starting of the emission of the infrared ray is shown.

First, at step F1, it is judged whether the data amount of the input data S25 is very small. The "very small" means a state where data to be transmitted is small and an almost empty block is transmitted when transmitting a transfer block by using an assigned time slot. For example, it is judged by comparing a preset data amount with the above data amount.

When the data amount of the input data S25 is judged not small, the MPU waits until the data amount of the input data S25 becomes small. Here, when an assigned time slots arrives, a transfer block including the input data S25 is transmitted to the control node 90 in the assigned time slot.

When the data amount of the input data S25 is small, the routine proceeds to step F2.

At step F2, it is judged whether a sufficient time has passed after the light emission circuit 42 started to emit. The "sufficient times" means a time of a length not causing any serious spurious waves due to an increase of a modulated signal component in a sub-carrier frequency band of not less than 33 kHz and less that 6 MHZ when the light emission is stopped. For example, this is judged by storing the previous emission restarting time in an internal memory device and determining whether a predetermined time has passed from the previous light emission restarting time.

When a sufficient time has not passed, the routine returns to step F1.

When a sufficient time has passed, the routine proceeds to step F3.

By judging whether a sufficient time has passed as explained above, the modulated signal component in the sub-carrier frequency band or its square (or power level) is made a value lower than the frequency component of a reference wave or its square (or power level) by not more than the maximum allowable value and thus a serious spurious wave is not generated. As an example, the power level of the sub-carrier frequency band may be made a value lower than the power level of the reference wave by not more than 40 dB.

At step F3, it is judged whether a time slot is assigned to the controlled node 100 based on the enabling signal in the control block from the control node 90. When the assigned time slot arrives, the routine proceeds to step F4.

At step F4, light emission suspension information including information indicating stopping of the infrared ray emission and information indicating a light emission restarting time S is generated, and a transfer block including the light emission suspension information is transferred to the control node 90 by using the assigned time slot.

Specifically, by outputting a signal S26 indicating the light emission information to the signal conversion circuit 62, converting it into a signal S27, and controlling the switch 61 to switch by the switch control signal S29, the signal S27 is inserted in part of the transfer block and the transmission signal S11 is generated and output to the transmission device 40.

As the light emission restarting time S, a time after the elapse of a time of an extent not generating any serious spurious waves in a sub-carrier frequency band of not less than 33 kHz and less than 6 MHZ is chosen.

At step F5, it is again judged whether a time slot is assigned to the controlled node 100. When the assigned time slot arrives, the routine proceeds to step F6.

At step F6, a light emission control signal (light emission stopping signal) S16 for stopping light emission is output to instruct the light emission circuit 42 to stop light emission, then the routine proceeds to step F7. The light emission circuit 42 stops emitting light in the assigned time slot based on the light emission control signal S16.

At step F7, it is judged whether the current time is a time T. When the time T arrives, the routine proceeds to step F8. Here, the time T is a time a little earlier than the light emission restarting time S.

At step F8, it is again judged whether a time slot is assigned to the controlled node. When the assigned time slot arrives, the routine proceeds to step F9.

At step F9, a light emission control signal (light emission starting signal) S16 for starting the light emission is output to the light emission circuit 42 to instruct it to start emitting the light, then the routine returns to step F1. The light emission circuit 42 starts emitting light in the assigned time slot based on the light emission starting signal S16.

Operation of Control Node 90

The operation of the control node 90 will be explained next with reference to FIG. 4.

Figure 4:
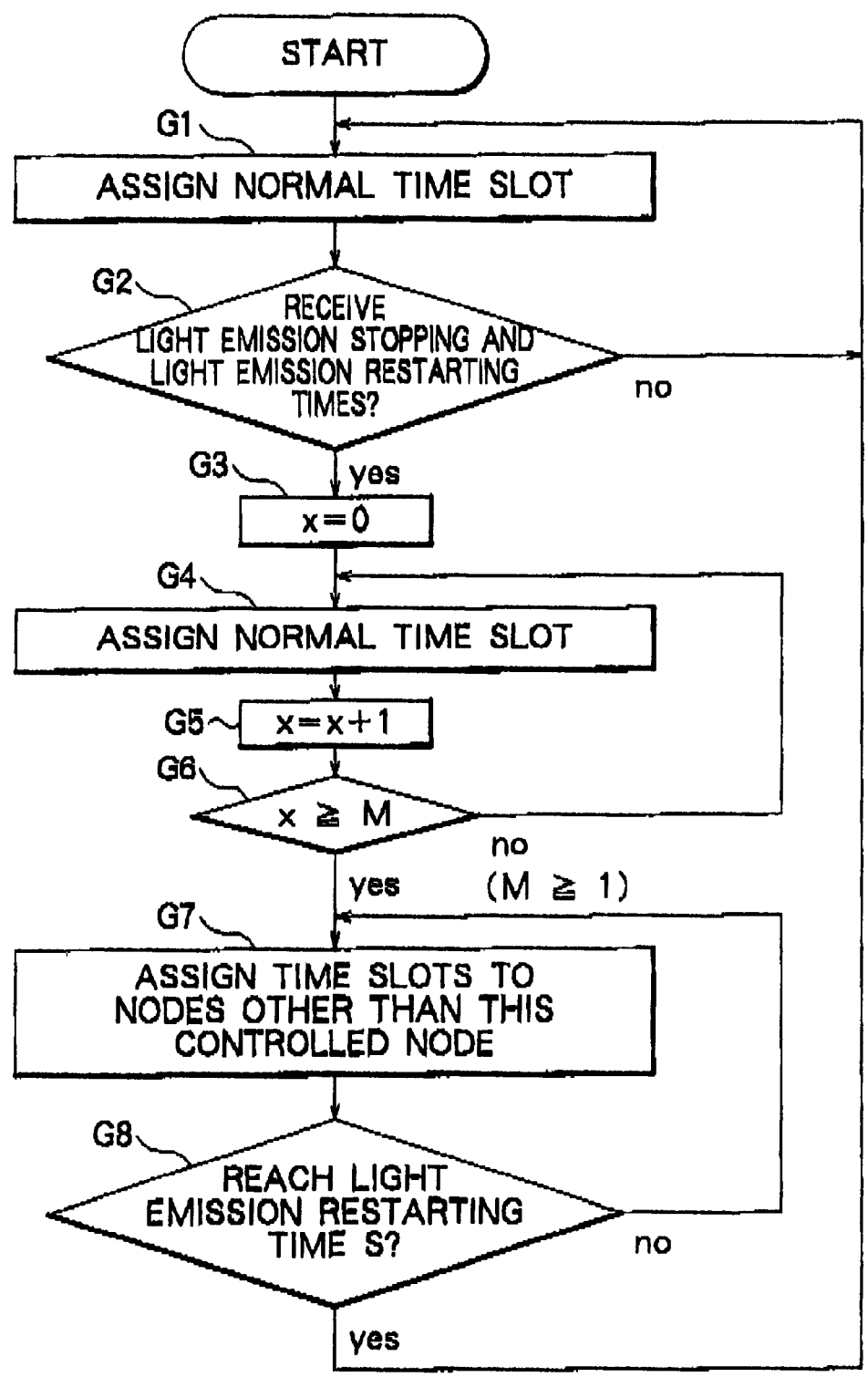
FIG. 4 is a schematic flow chart of the operation of a control node and the control operation of an MPU.

FIG. 4 is a schematic flow chart of the operation of the control node 90 and control operation of the MPU 30. Here, the control operation relating to assignment of a time slot is shown. Also, a case of a wireless optical communication system comprising a control node 90 and three controlled nodes 100A to 100C will be explained.

At step G1, first, time slots are normally assigned, a control block including an enabling signal corresponding to the assignment is transmitted to the controlled nodes 100A to 100C, then the routine proceeds to step G2. For example, the control node 90 performs the normal assignment by equally assigning time slots to the control node 90 and the controlled nodes 100A to 100C.

At step G2, it is judged whether light emission suspension information including information of stopping an infrared ray emission and information of a light emission restarting time S is received by referring to output data S20 of the signal conversion circuit 32.

When the light emission suspension information is not received, the routine returns to step G1.

When the light emission suspension information is received, the routine proceeds to step G3.

In the following steps G3 to G6, time slots are assigned at least once to the controlled node (for example, the controlled node 100A) which transmitted the light emission suspension information, and a control block including an enabling signal corresponding to the assignment is transmitted to the controlled nodes 100A to 100C.

This is because the time slot assigned to the node 100A is used when the controlled node 100A which transmitted the light emission suspension information stops the emission of the infrared ray.

At step G3, a variable x is cleared and reset to 0.

At step G4, time slots are normally-assigned to the controlled nodes 100A to 100C, and a control block including an enabling signal corresponding to the assignment is transmitted to the controlled nodes 100A to 100C.

At step G5, when a time slot is assigned to the controlled node 100A at step G4, the value of the variable x is incremented to add exactly one, while when a time slot is not assigned to the controlled node 100A at step G4, the value of the variable x is left as it is.

At step G6, whether the value of the variable x is a predetermined value M or more (M≧1) is judged.

When the value of the variable x is less than the predetermined value M, the routine returns to step G4, where the time slots are normally assigned.

When the value of the variable x is the predetermined value M or more, the routine proceeds to step G7.

At step G7, time slots are assigned to the controlled nodes 100B and 100C other than the controlled node 100A or the control node 90, a control block including an enabling signal corresponding to the assignment is transmitted to the controlled nodes 100A to 100C, and the routine proceeds to step G8.

At step G8, it is judged whether the current time is the light emission restarting time S.

When it is not yet the light emission restarting time S, the routine returns to step G7, where time slots are assigned to the nodes other than the controlled node.

When it is the light emission restarting time S, the routine returns to step G1.

Note that while it was explained that the normal assignment of time slots was performed M times at steps G3 to G6, a plurality of time slots may be assigned to the controlled node 100A.

Figure 5:
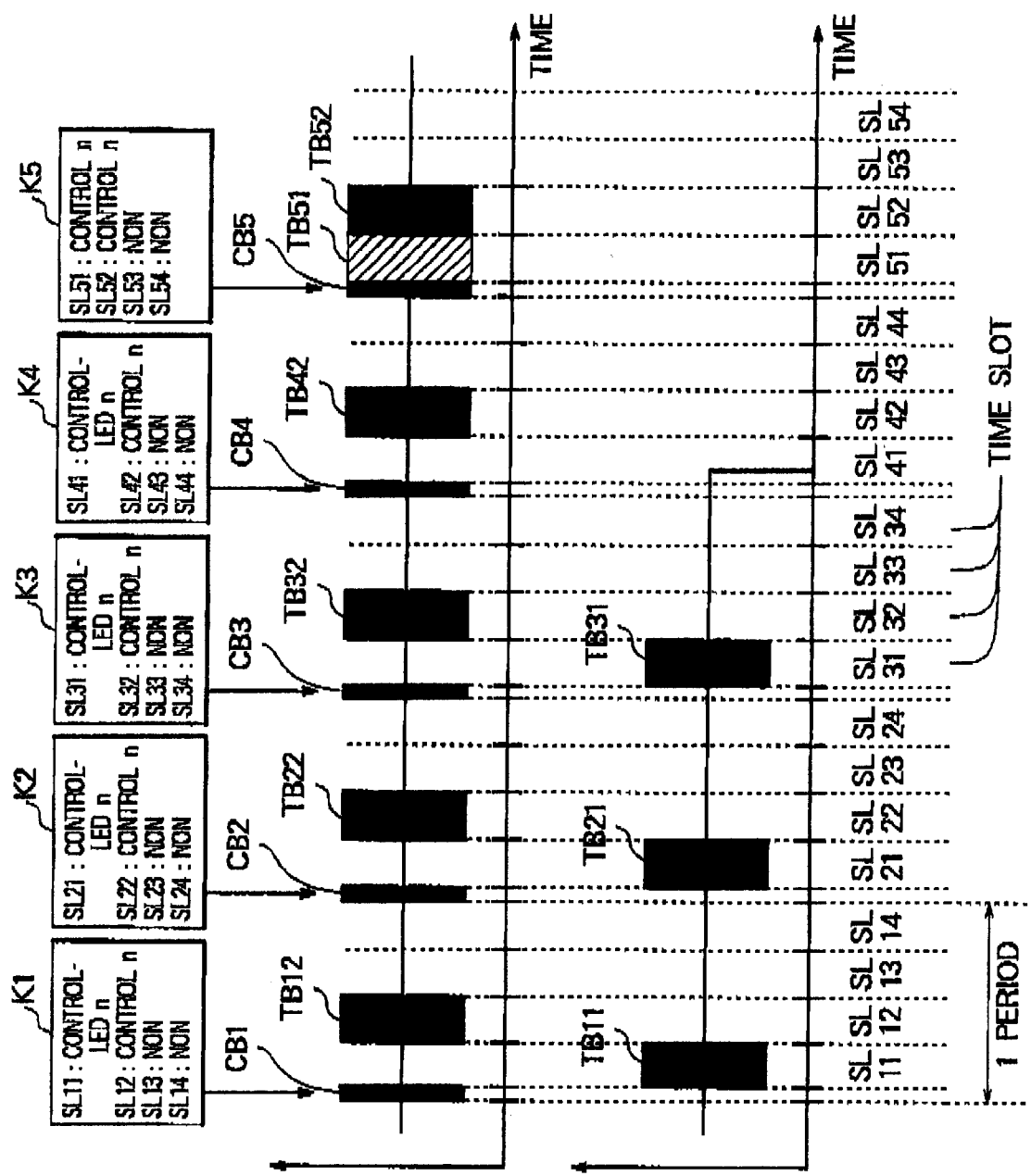
FIGS. 5A to 5C are views of the relationship of stopping emission of an infrared ray by an enabling signal and time slots.

At step G7, time slots not assigned to the controlled node 100A are assigned to the nodes participating in the optical communication (the control node 90 in FIG. 5). However, by assigning them to nodes not participating in the optical communication, the number of controlled nodes for performing optical communication can be increased and the amount of communication of nodes other than the control node 90 and the controlled node 100A can be increased.

The control node 90 is made to transmit a transfer block including input data S21 to the controlled nodes 100A to 100C in the assigned time slot when that assigned time slot arrives at the control node 90.

Assigned Time Slot and Infrared Ray Emission Intensity

Next, the relationship of the emission intensity (signal strength) of an infrared ray emitted by the light emission circuit of the transmission device and the assigned time slots in a wireless optical communication system according to the present invention will be explained with reference to FIGS. 5 and 6. The case of the above first embodiment will be explained here.

FIGS. 5A to 5C are views of the relationship of stopping of infrared ray emission and time slots.

FIGS. 6A to 6C are views of the relationship of starting of infrared ray emission and time slots.

FIG. 6A is a continuation from FIG. 5C.

In the figures, "controlled n" indicates a controlled node and "control n" indicates a control node.

In FIG. 5A and FIG. 6A, assignment information of time slots included in a control block is illustrated as enabling signals K1 to K5 and K10 to K14 corresponding to the control blocks CB1 to CB5 and CB10 to CB14.

In FIG. 5B and FIG. 6B, the signal strength (amplitude) of the infrared ray output by the control node 90 is shown. A control block CB and a transfer blot TB are illustrated in accordance with the amplitude.

In FIG. 5C and FIG. 6C, the signal strength (amplitude) of the infrared ray output by the controlled node 100 is shown. A transfer blot TB is illustrated in accordance with the amplitude.

Note that one cycle between the control blocks CB is considered to be 125 μs (microsecond) as an example in the present embodiment.

The control node 90 cyclically transmits the control blocks CB1 to CB14 to the controlled node 100. The control blocks CB1 to CB14 correspond to the enabling signals K1 to K14 of time slots. The control blocks CB1 to CB14 include the corresponding enabling signals K1 to K14.

The MPU 30 of the control node 90 first normally assigns time slots and generates normal enabling signals K1 to K3. Here, for simplification, the enabling signals K1 to K3 are made identical and the respective assignment information is considered to indicate time slot assignments in the same cycle.

Based on the enabling signal K1 included in the control block CB1, the controlled node 100 transmits a transfer block TB11 in a time slot SL11, while the control node 90 transmits a transfer block TB12 in a time slot SL12.

Similarly, based on the enabling signal K2 included in the control block CB2, the controlled node 100 transfers a transfer block TB21 in a time slot SL21, while the control node 90 transmits a transfer block TB22 in a time slot SL22.

Assume that the MPU 60 of the controlled node 100 now judges that the data amount of the input data S25 is very small and that a sufficient time has passed since starting of the light emission by the light emission circuit 42 (the above steps F1 and F2).

The MPU 60 refers to the enabling signal K3 of the next control block CB3 and detects that a time slot SL 31 is the one assigned to its own node (the above step F3).

Then, the MPU 60 transmits a transfer block TB31 including light emission suspension information indicating stopping of the light emission and the light emission restarting time S in the time slot SL31 (the above step F4).

The MPU 30 of the control node 90 generates normal time slot assignment information and generates an enabling signal K4 indicating the assignment information again (the above steps G3 to G6, note M=1) when detecting light emission suspension information indicating stopping of light emission and the light emission restarting time S in the output data S20 of the signal conversion circuit 32 (the above step G2).

The MPU 60 of the controlled node 100 refers to the enabling signal K4 in the control block CB4, detects that a time slot SL41 is the time slot assigned to its own node 100, and stops the emission of the infrared ray in the same time slot SL41 (the above steps F5 and F6).

Then, it waits until the time T (the above step F7). The time T is a time earlier than the light emission restarting time S by exactly one cycle as an example.

On the other hand, the MPU 30 of the control node 90 assigns time slots originally for assignment to the same controlled node to other nodes (the control node 90 here) until the light emission restarting time S arrives and generates enabling signals K5 to K11 (the above steps G7 and G8).

Then, when the light emission restarting time S arrives, it generates the enabling signal K12 indicating normal time slot assignment information and transmits a control block CB12 (the above block G1).

The MPU 60 of the controlled node 100 which had been waiting until the time T refers to the enabling signal K12 in the control block CB12, detects that a time slot SL121 is the time slot for its own node, and starts the emission of the infrared ray in the same time slot SL121 (the above steps F8 and F9).

Then, it transmits a transfer block TB131 from the next assigned time slot SL131.

In this way, it is possible to reduce the power consumption by shortening the light emission time by a controlled node having a small amount of input data while preventing interference with remote controls and other existing infrared communication devices using a sub-carrier frequency band of not less than 33 kHz and less than 6 MHZ.

Further, by stopping and starting the light emission in the controlled node so that the modulated signal component in the sub-carrier frequency band of not less than 33 kHz and less than 6 MHZ becomes under the maximum allowable value, it becomes possible to suppress interference with remote controls and other existing infrared communication device using the sub-carrier frequency band and to thereby enable use at the same time as existing optical communication devices.

The MPU 60 of the above controlled node 100 was configured to determine the stopping and restarting of emission of the infrared ray by monitoring the data amount of the input data S25. This corresponds to judgment by estimating the data amount to be input in the future from the data amount of the input data S25 input in the past.

Instead of judging by estimating in this way, it is possible to temporarily store the input data S25 in a buffer memory and determine the stopping and restarting of the light emission from the data amount of the input data stored in the buffer memory.

Figure 6:
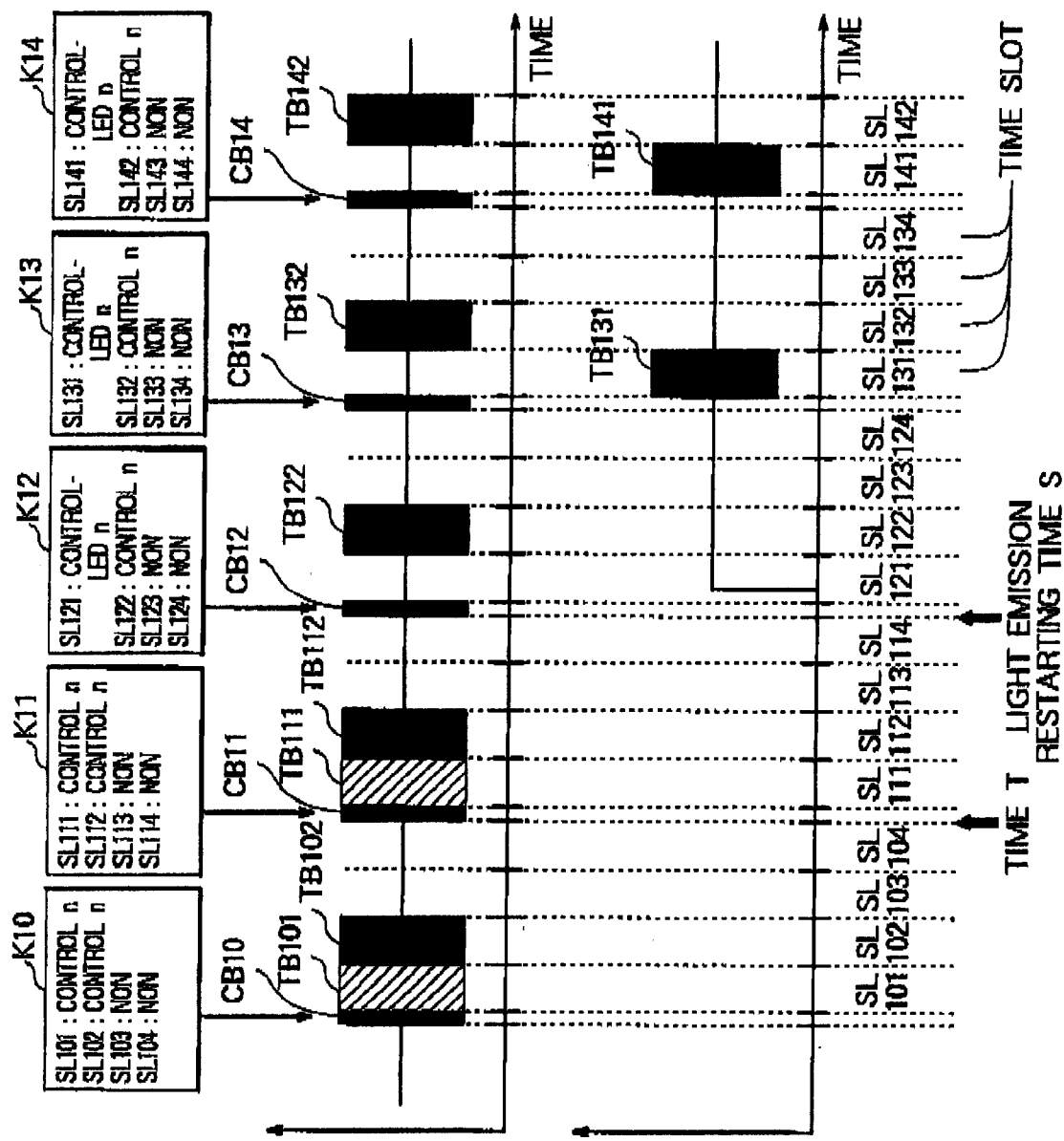
FIGS. 6A to 6C are views of the relationship of starting emission of an infrared ray by an enabling signal and time slots continued from FIG. 5.
Figure 7:
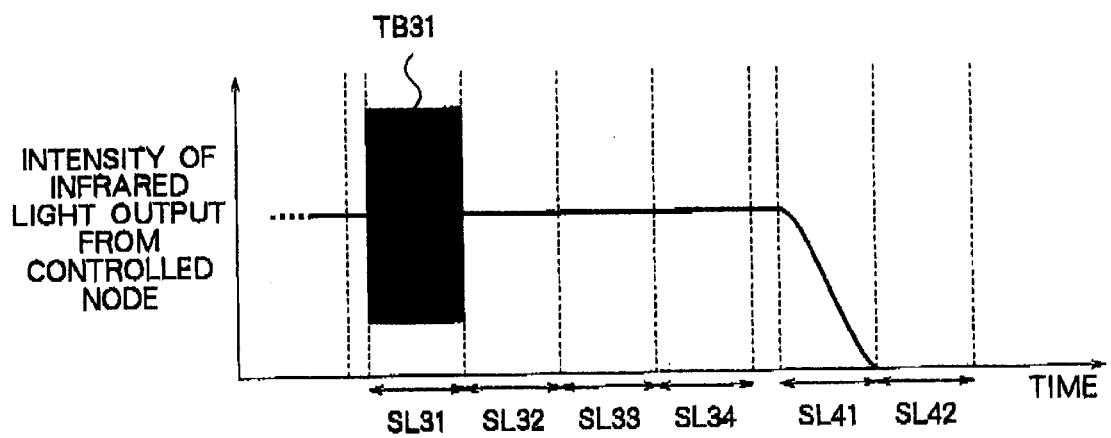
FIG. 7 is a view of an amplitude of an infrared ray output by a controlled node when gradually reducing emission of the infrared ray.

In the above FIGS. 5 and 6, the emission of the infrared ray is stopped and started instantaneously, however, as shown in FIG. 7, it is also possible to give a gradual transient property of an extent able to fit in an assigned time slot or of about one cycle and use this to change the infrared ray from a predetermined signal intensity to zero signal intensity or from the zero signal intensity to a predetermined signal intensity.

For example, a time constant obtained from a capacitor and a resistor may be used to change the power source voltage of the light emission circuit from a predetermined voltage value to zero voltage or from the zero voltage to a predetermined voltage value.

By stopping and starting the light emission by a timing, pattern, or transient property so that the modulated signal component in the sub-carrier frequency band of, for example, not more than 33 kHz and less than 6 MHZ, becomes under the maximum allowable value in this way, it becomes possible to suppress the modulated signal component in the sub-carrier frequency band generated by the stopping and starting of light emission and thereby reduce the spurious waves and possible to shorten the period from the stopping of the light emission to the starting of the light emission or from the starting of the light emission to the stopping of the light emission.

Figure 8:
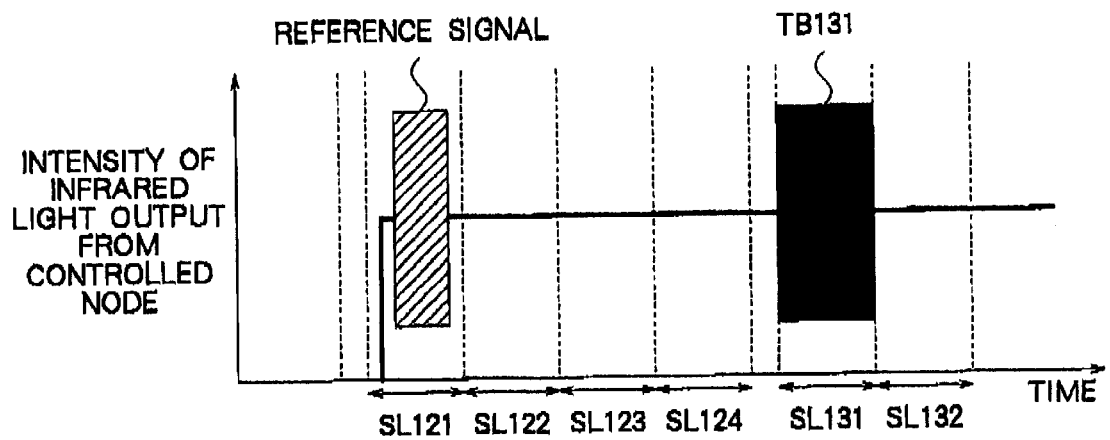
FIG. 8 is a view of an amplitude of an infrared ray output by a controlled node when abruptly increasing emission of the infrared ray.

Further, as shown in FIG. 8, it is possible to transmit a reference signal in the same time slot SL121 at the time of restarting the emission of the infrared ray to make the preparations for reception (amplitude adjustment, synchronization adjustment, etc.) of the control node 90 for data to be transmitted from the controlled node 100 in the time slot SL121.

In the optical communication system of the above first embodiment, an example was explained where the emission of an infrared ray were stopped and started in an assigned time slot.

However, it is also possible to providing a non-communication period (gap) between time slots and stop and start the infrared ray emission during the non-communication period rather than in the time slot.

In this case, it becomes possible to increase the number of time slots able to be used for data transfer comparing with the case of stopping and starting the light emission in a time slot, thus it is possible to prevent waste of the time slots.

Note that it is also possible to stop the light emission in a gap and start the light emission in an assigned slot or stop the light emission in an assigned time slot and start the light emission in a gap.

Further, in the optical communication system of the above first embodiment, the controlled node 100 was configured to transmit to the control node 90 light emission suspension information containing the stopping of the light emission and the light emission restarting time S, however, it is also possible to register in the control node 90 a plurality of patterns (or types) of different light emission suspension information or light emission suspension periods and transmit to the control node 90 selection information indicating which pattern (or type) to select.

Second Embodiment

A second embodiment of a wireless optical communication system according to the present invention will be explained next.

In the above first embodiment, whether or not to suspend light emission for a predetermined period was judged in a controlled node. In the second embodiment, it is judged in the control node.

Figure 9:
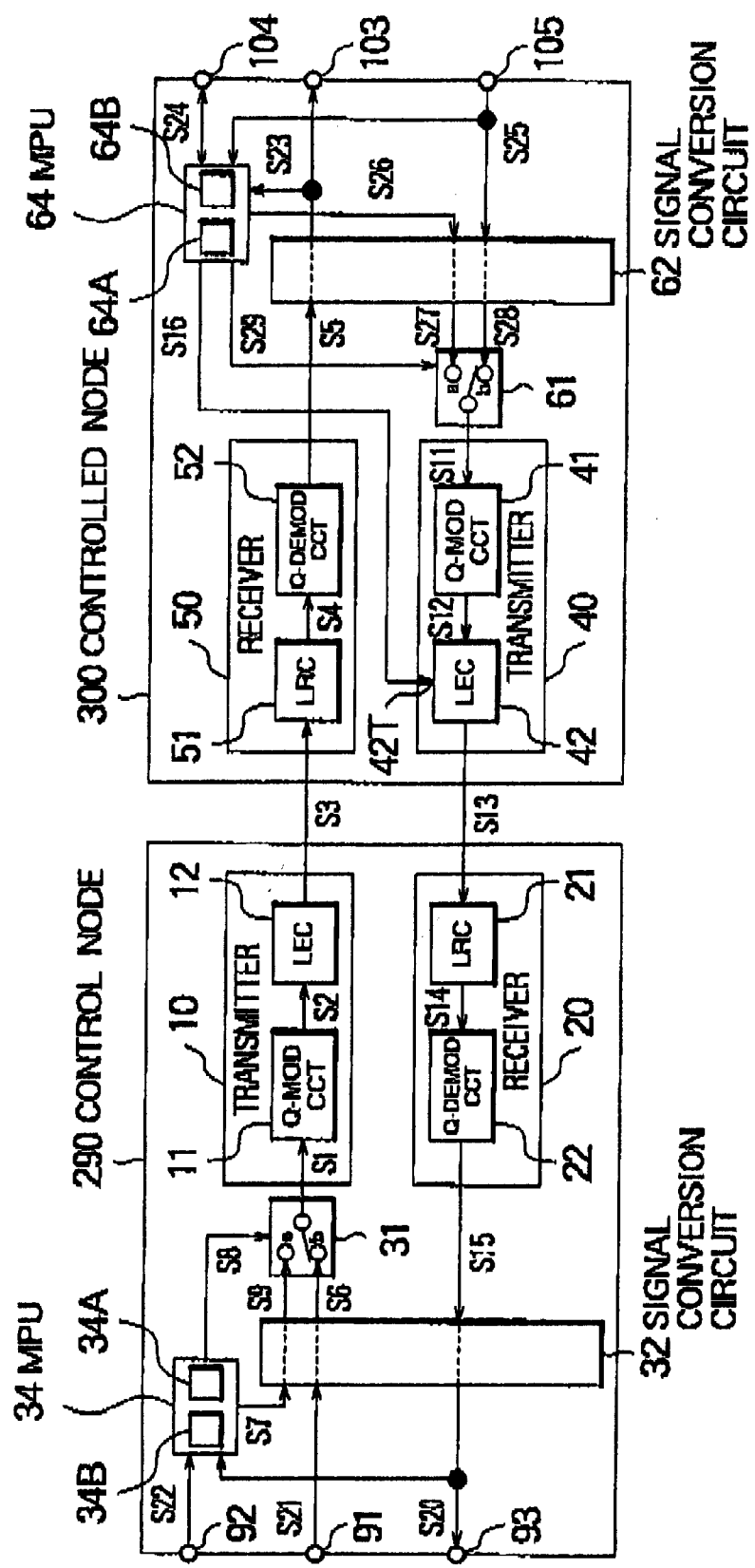
FIG. 9 is a schematic block diagram of the configuration of a control node and a controlled node included in a wireless optical communication system according to a second embodiment of the present invention.

FIG. 9 is a schematic block diagram of the configuration of a control node 290 and a controlled node 300 used in a wireless optical communication system of the second embodiment of the present invention.

In FIG. 9, an example of one-to-one optical communication between one control node 290 and one controlled node 300 is illustrated, however, the invention can also be applied to one-to-many optical communication.

Further, in FIG. 9, components of the same configuration as the components of the control node 90 and the controlled node 100 in FIG. 1 are given the same reference numerals and explanations of identical components are omitted.

A light emission control means 64A and an amount information generation means 64B in an MPU 64 in FIG. 9 have almost the same configuration as the light emission control means 60A and the amount information generation means 60B in the MPU 60 in FIG. 1, while an assignment means 34A in an MPU 34 has almost the same configuration as the assignment means 30A in the MPU 30 in FIG. 1.

The control node 290 comprises a transmission device (transmitter) 10, a reception device (receiver) 20, a microprocessing unit (MPU) 34, a switch 31, and a signal conversion circuit 32.

The MPU 34 is a controller for overall control of the control node 290 and comprises an assignment means 34A and an instruction information generation means 34B.

The assignment means 34A assigns time slots, generates assignment information, and outputs an enabling signal indicating the assignment information as a signal S7 to the signal conversion circuit 32.

The instruction information generation means 34B generates instruction information for suspending light emission by the light emission circuit 42 of the controlled node 300 for a predetermined period and outputs the instruction information as a signal S7 to the signal conversion circuit 32.

The controlled node 300 comprises a transmission device (transmitter) 40, a reception device (receiver) 50, an MPU 64, a switch 61, and a signal conversion circuit 62.

The MPU 64 is a controller for overall control of the controlled node 300 and comprises a light emission control means 64A and an amount information generation means 64B.

The light emission control means 64A generates a light emission control signal S16 and outputs it to the light emission circuit 42.

The amount information generation means 64B monitors the input data S25 to generate amount information of the input data S25, supplies the amount information to the light emission control means 64A, and outputs the amount information as a signal S26 to the signal conversion circuit 62.

The assignment means 34A included in the MPU 34 of the control node 290 assigns time slots after N cycles (N≧1) based on the instruction signal S22 input to the terminal 92 from an outside device, for example, an upper layer, and the output data S20 and outputs an enabling signal indicating assignment information as a signal S7 to the signal conversion circuit 32.

Further, the instruction information generation means 34B generates instruction information including information to instruct stopping of light emission of the light emission circuit 42 and the light emission .restarting time S based on the amount information in the output data S20 and outputs it as a signal S7 to the signal conversion circuit 32.

The signal S7 is converted to a signal S9 of a format for infrared communication in the signal conversion circuit 32. The signal S9 is supplied to one switchable terminal a of the switch 31.

The switch 31 is receives a transfer block or a control block as a signal S6 from the signal conversion circuit 32 at the other switchable terminal b and switches the switchable terminals a and b based on the switch control signal S8 from the MPU 34.

When transmitting a normal transfer block, the MPU 34 controls the switch 31 to switch to the switchable terminal b side by the switch control signal S8 so that the signal S6 of the transfer block is transferred as it is as a signal S1 to the transmission device 10.

When transmitting a control block, the MPU 34 controls the switch 31 to switch the switchable terminals a and b by the switch control signal S8 so that the signal S9 is inserted to part of the control block. Here, the switch 31 operates as a multiplexer. As a result, a transmission signal S1 having the configuration as shown in FIG. 20, wherein the signal S9 is inserted to part of a signal S6 of the control block, can be generated.

The signal S9 inserted to the control block at this time is a signal indicating assignment information of time slots after N cycles and approval of time slots and is also a signal indicating the instruction information.

On the other hand, the light emission control means 64A in the MPU 64 of the controlled node 100 is supplied with output data S23 from the signal conversion circuit 62 and detects the control block from the control node 90.

The amount information generation means 64B in the MPU 64 generates amount information of the input data S25 and supplies it to the light emission control means 64A and further outputs the amount information as a signal S26 to the signal conversion circuit 62.

The light emission control means 64A refers the enabling signal and the instruction information in the control block and controls the light emission of the light emission circuit by the light emission control signal S16 to start and stop the infrared ray emission.

The signal S26 from the amount information generation means 64B is input to the signal conversion circuit 62. The signal conversion circuit 62 converts the signal S26 to a signal S27 of a format for infrared communication,and supplies the signal S27 to one switchable terminal a of the switch 61.

The switch 61 receives a transfer block as a signal S28 from the signal conversion circuit 62 at the other switchable terminal b and switches the terminals a and b based on the switch control signal S29 from the MPU 29.

The MPU 64 switches the switch 61 by the switch control signal S29 to insert a signal S27 to part of the signal S28 of the transfer block. A transmission signal S11 of the transfer block is output to the transmission device from the switch 61.

Operation of Controlled Node 300

The operation of the controlled node 300 will be explained with reference to FIG. 10 and FIG. 11 next.

Figure 10:
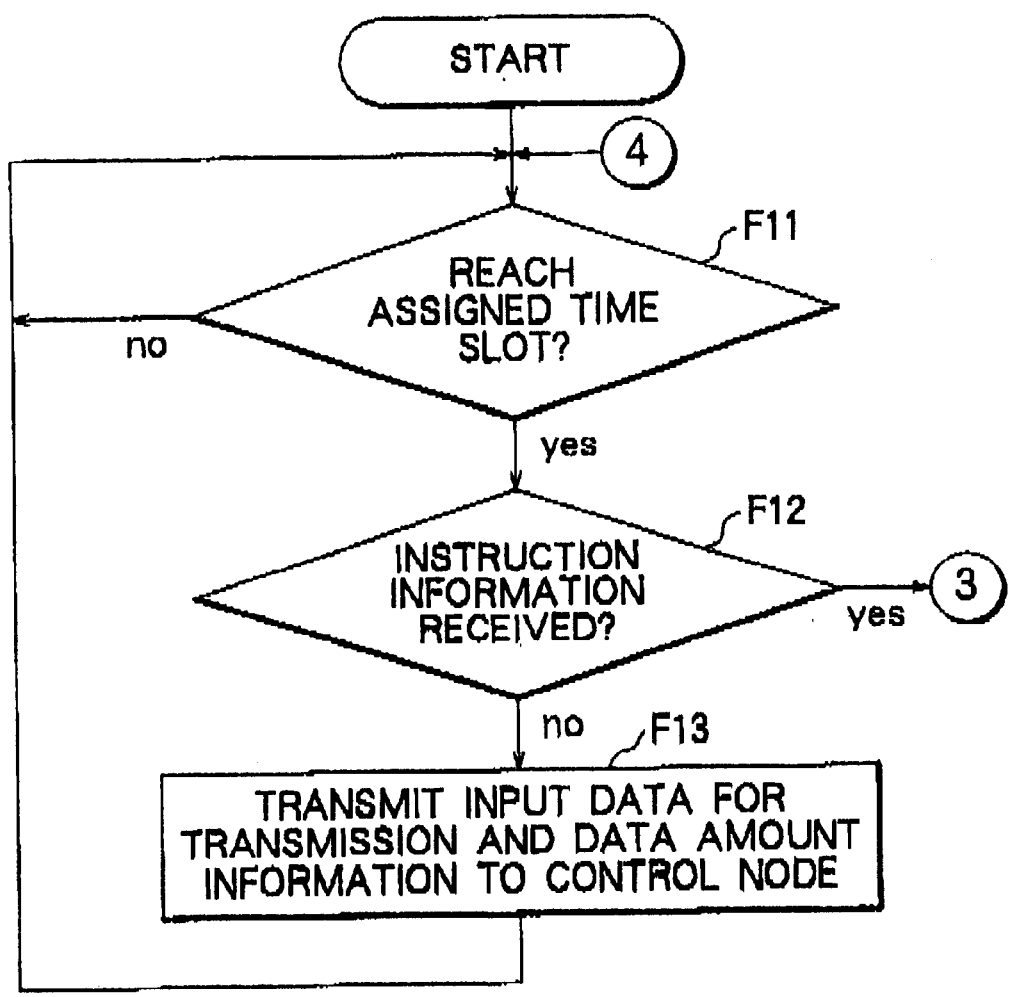
FIG. 10 is a schematic flow chart of the operation of a controlled node and the control operation of an MPU.
Figure 11:
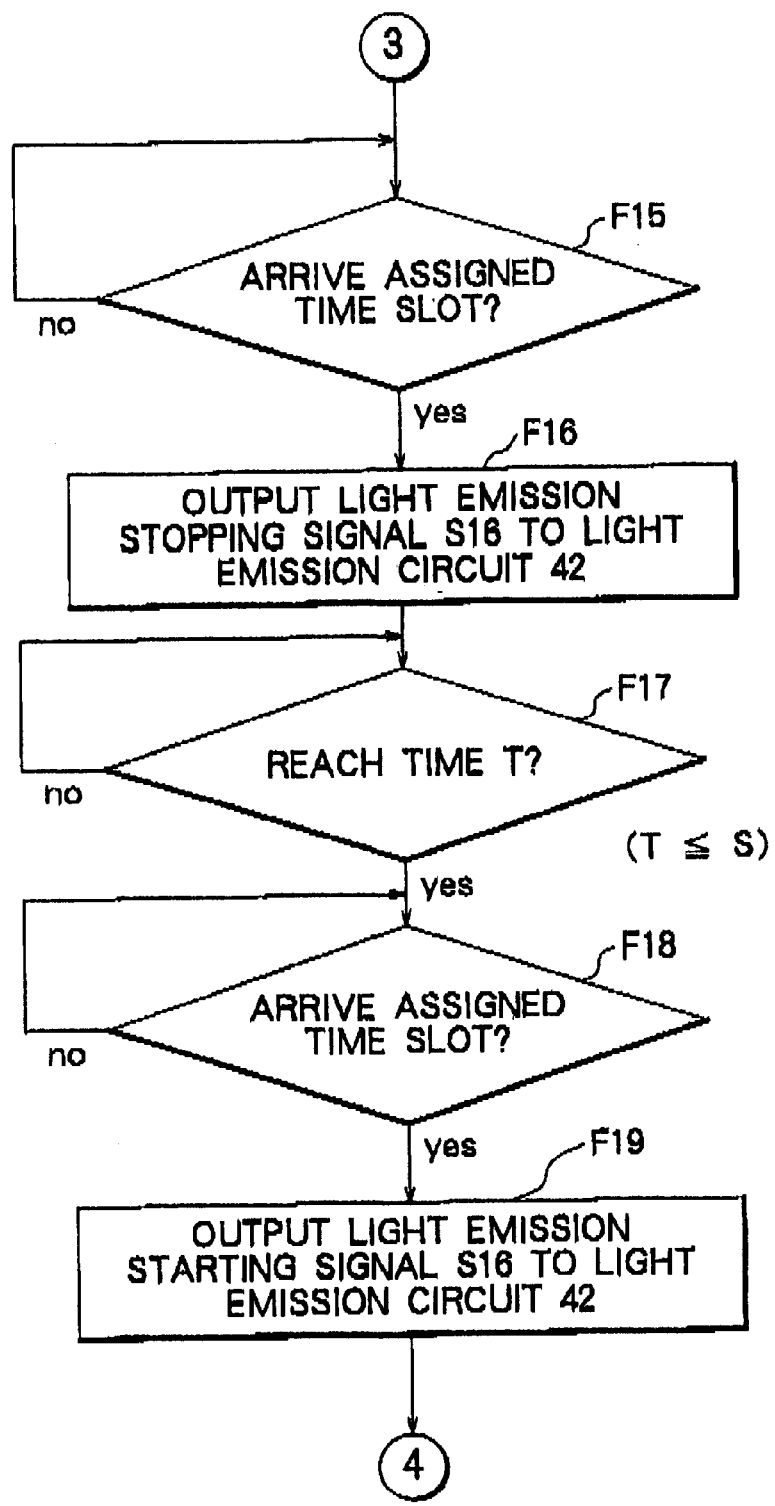
FIG. 11 is a schematic flow chart of the operation of a controlled node and the control operation of an MPU continued from FIG. 10.

FIGS. 10 and 11 are schematic flow charts of the operation of a controlled node 300 and the control operation of the MPU 64. Here, a control operation relating to stopping and starting of the infrared ray emission will be shown.

First, at step F11, it is judged whether a time slot is assigned to the controlled node 300 based on a transmission enabling signal in the output data S23. When an assigned time slot arrives, the routine proceeds to step F12.

At step F12, it is judged whether instruction information including information to instruct stopping of infrared ray emission and a light emission restarting time S is received.

When the instruction information is received, the routine proceeds to step F15.

When the instruction information is not received, the routine proceeds to step F13.

At step F13, a transfer block including input data for transmission and amount information is generated and transmitted to the control node 290 by using the assigned time slot.

Specifically, by outputting the signal S26 indicating amount information to the signal conversion circuit 62 and converting it to a signal S27 and by controlling the switch 61 to switch by the switch control signal S29, the signal S27 is inserted to part of the signal S28 of the transfer block and a transmission signal S11 is generated and output to the transmission device 40.

At step F15, it is judged whether a time slot is assigned to the controlled node 300 again. When the assigned time slot arrives, the routine proceeds to step F16.

At step F16, a light emission control signal S16 for stopping the light emission is output to the light emission circuit 42 to instruct the light emission circuit 42 to stop light emission, then the routine proceeds to step F17. The light emission circuit 42 stops the light emission in the assigned time slot.

At step F17, it is judged whether the current time is a time T. When the time T, the routine proceeds to step F18. Here, the time T is a time a little earlier than the light emission restarting time S in the instruction information.

At step F18, it is judged whether a time slot is assigned to the controlled node 300 again. When the assigned time slot arrives, the routine proceeds to step F19.

At step F19, a light emission starting signal S16 for starting the light emission is output to the light emission circuit 42 to instruct the light emission circuit 42 to start the light emission, then the routine returns to step F11. The light emission circuit 42 starts the light emission in the assigned time slot based on the light emission starting signal S16.

Operation of Control Node 290

The operation of the control node 290 will be explained next with reference to FIG. 12 and FIG. 13.

Figure 12:
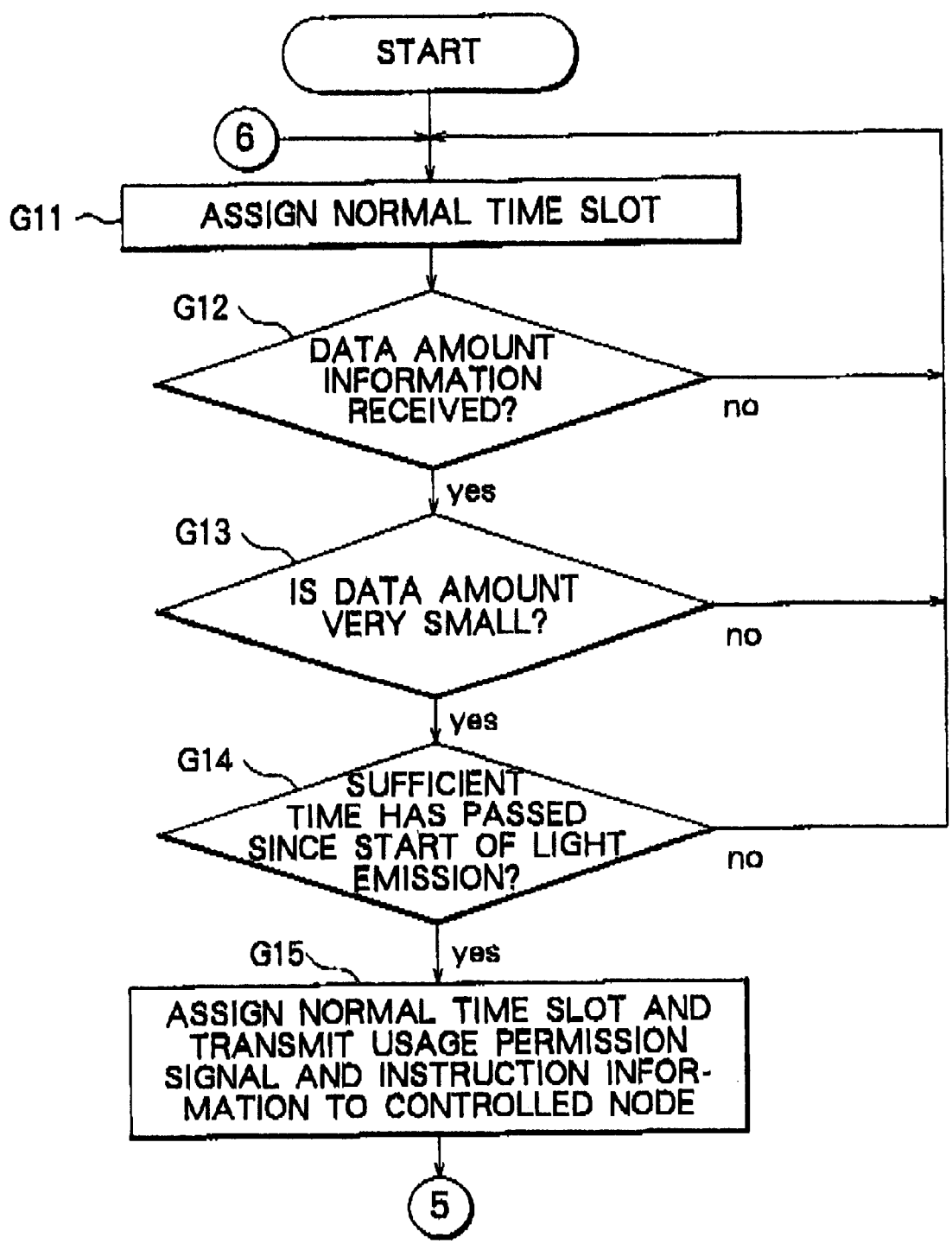
FIG. 12 is a schematic flow chart of the operation of a control node and the control operation of an MPU.
Figure 13:
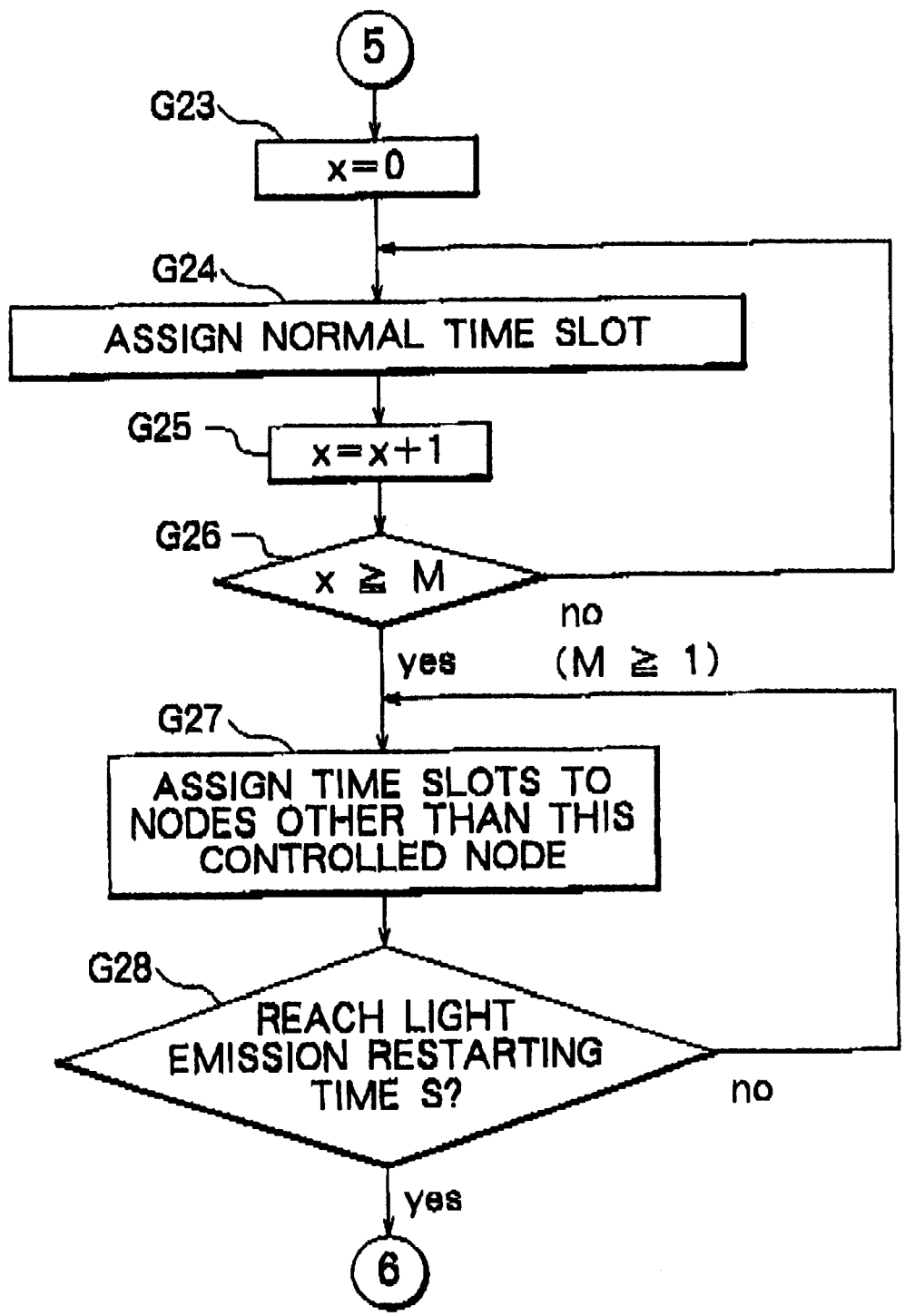
FIG. 13 is a schematic flow chart of the operation of a control node and the control operation of an MPU continued from FIG. 12.

FIGS. 12 and 13 are schematic flow charts of the operation of the control node 290 and the control operation of the MPU 34. Here, the control operation relating to the assignment of time slots is shown. Also, a case of a wireless optical communication system comprising a control node 290 and three controlled nodes 300A to 300C will be explained.

First, at step G11, time slots are normally assigned, a control block including an enabling signal corresponding to the assignment is transmitted to the controlled nodes 300A to 300C, then the routine proceeds to step G12. For example, the control node 290 assigns time slots normally by equally assigning time slots to the control node 290 and the controlled nodes 300A to 300C.

At step G12, output data S20 of the signal conversion circuit 32 is referred to so as to judge whether amount information of the input data S25 is received.

When the amount information is not received, the routine returns to step G11.

When the amount information is received, the routine proceeds to step G13.

At step G13, it is judged whether the data amount of the input data S25 is very small. This is judged for example by comparing the data amount with a predetermined data amount.

When it is judged to be not very small, the routine returns to step G11 and time slots are normally assigned. Here, when a time slot assigned to the control node 290 arrives, a transfer block including the input data S21 is transmitted to the controlled nodes 300A to 300C in the assigned time unit.

When the data amount is very small, the routine proceeds to step G14.

At step G14, it is judged whether a sufficient time has passed since the starting of light emission by the light emission circuit 42. For example, this is judged by storing the previous light emission restarting time in an internal memory device and determining whether a predetermined time has passed since the previous light emission restarting time.

When a sufficient time has not passed, the routine returns to step G11.

When a sufficient time has passed, the routine proceeds to step G15.

At step G15, the time slots are normally assigned. Also, instruction information including information to instruct stopping of light emission and information indicating (or designating) a light emission restarting time S is generated for a controlled node having a very small data amount and for which a sufficient time has passed (for example, the controlled node 300A), and a control block including the instruction information and an enabling signal is transmitted to the controlled nodes 300A to 300C.

In the following steps G23 to G26, one or more time slots are assigned to the controlled node 300A.

This is because when the controlled node 300A receiving the instruction information stops the infrared ray emission, the time slot assigned to that own node 300A is used.

At step G23, a variable x is cleared and reset to 0.

At step G24, time slots are normally assigned to the controlled nodes 300A to 300C, and a control block including an enabling signal corresponding to the assignment Is transmitted to the controlled nodes 300A to 300C.

At step G25, the value of the variable x is incremented to add exactly 1 when a time slot is assigned to the controlled node 300A at step G24, while the variable x is left as it is when a time slot is not assigned to the controlled node at step G24.

At step G26, it is judged whether the value of the variable x is a predetermined value M or more (M≧1).

When the value of the variable x is less than the predetermined value M, the routine returns to step G24 where time slots are normally assigned to the controlled nodes 300A to 300C.

When the value of the variable x is the predetermined value M or more, the routine proceeds to step G27.

At step G27, time slots are assigned to the controlled nodes 300B and 300C other than the controlled node 300A or the control node 290, a control block including an enabling signal corresponding to the assignment is transmitted to the controlled nodes 300A to 300C, then the routine proceeds to step G28.

At step G28, it is judged whether the current time is the light emission restarting time S.

When not yet the light emission restarting time S, the routine returns to step 27, where time slots are assigned to the controlled nodes 300B and 300C other than the controlled node 300A or the control node 290.

When the light emission restarting time S, the routine returns to step G11.

Note that at steps G23 to G26, time slots were normally assigned M times, however, it is also possible to assign a plurality of time slots to the controlled node 300A at one time.

At step G27, the time slots not assigned to the controlled node 300A were assigned to nodes participating in the optical communication, however, by assigning them to nodes not participating in the optical communication, it is possible to increase the number of controlled nodes participating in the optical communication and to increase the amount of communication of nodes other than the control node 290 and the controlled node 300A.

Further, in a wireless optical communication system of the above second embodiment, infrared ray emission may be stopped and started instantaneously as shown in FIGS. 5 and 6. It is also possible to give a gradual transient property of an extent able to fit in an assigned time slot or of about one cycle and use this to change the infrared ray from a predetermined signal intensity to zero signal intensity or from the zero signal intensity to a predetermined signal intensity as shown in FIG. 7.

By stopping and starting the light emission by a timing, pattern, or a transient property so that modulated signal component in the sub-carrier frequency band of, for example, not less than 33 kHz and less than 6 MHZ becomes less than a maximum allowable value, the modulated signal component in the sub-carrier frequency band generated by the stopping and starting of the light emission is suppressed to reduce spurious waves and it is possible to shorten the period from the stopping of the light emission to the starting of the light emission or the period from the starting of the light emission to the stopping of the light emission.

Also, as shown In FIG. 8, it is possible to transmit a reference signal In the same time slot SL121 at the time of restarting the emission of the infrared ray to make the preparations for reception (amplitude adjustment, synchronization adjustment, etc.) of the control node 290 for data to be transmitted from the controlled node 300 In the time slot SL121.

In the optical communication system of the above second embodiment, an example was explained where the emission of an infrared ray were stopped and started In an assigned time slot.

However, It Is also possible to providing a non-communication period (gap) between time slots and stop and start the infrared ray emission during the non-communication period rather than in the time slot.

In this case, it becomes possible to increase the number of time slots able to be used for data transfer comparing with the case of stopping and starting the light emission in a time slot, thus it is possible to prevent waste of the time slots.

Note that it is also possible to stop the light emission in a gap and start the light emission in an assigned slot or stop the light emission in an assigned time slot and start the light emission in a gap.

Third Embodiment

A third embodiment of a wireless optical communication system according to the present invention will be explained next.

In the above first and second embodiments, the optical communication system was configured to suspend light emission of the light emission circuit of a controlled node for a predetermined period, however, in the third embodiment, it is configured to suspend the light emission of the light emission circuit of a control circuit for a predetermined period.

Figure 14:
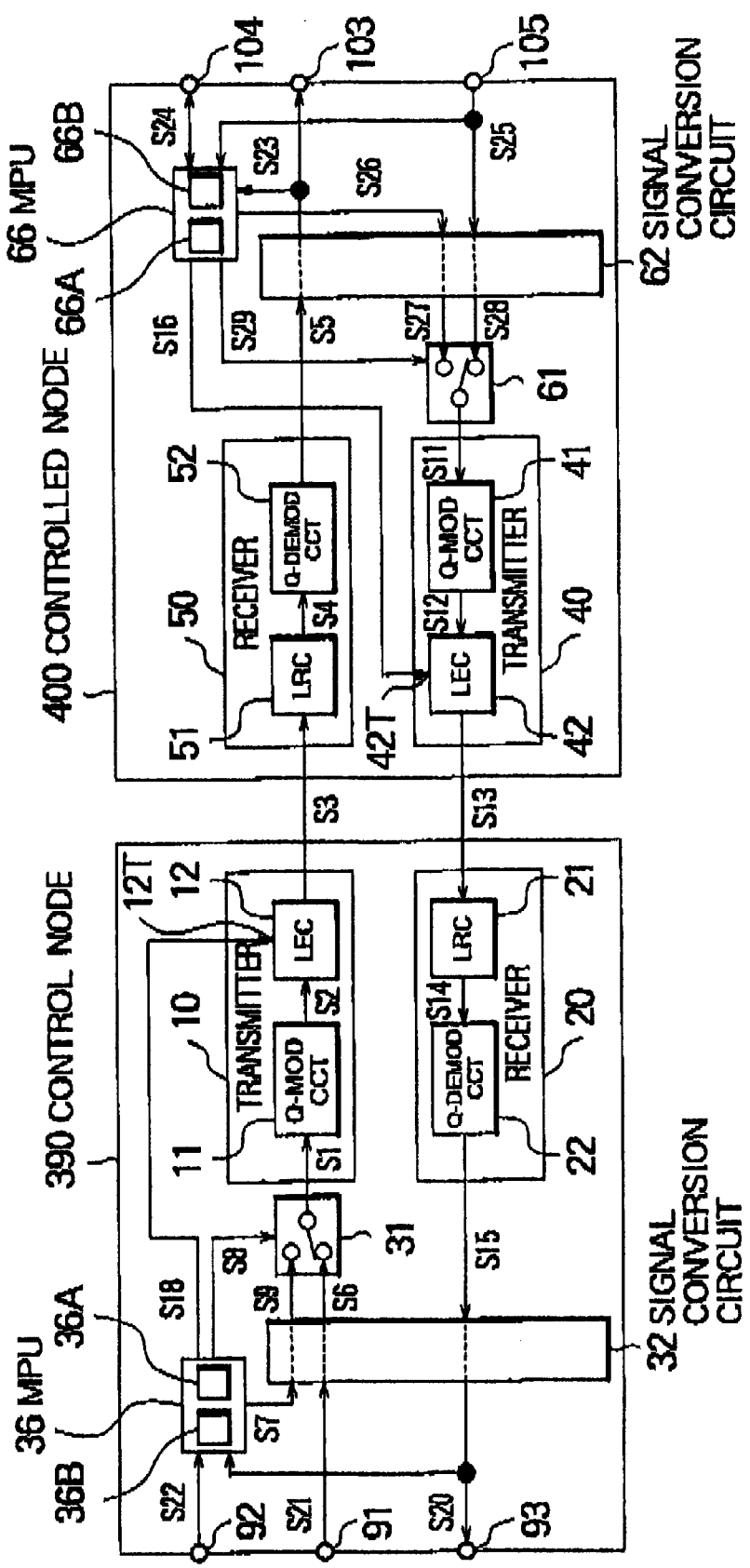
FIG. 14 is a schematic block diagram of a control node and a controlled node included in a wireless optical communication system according to a third embodiment of the present invention.

FIG. 14 is a schematic block diagram of the configuration of a control node 390 and a controlled node 400 used in the optical communication system of the third embodiment of the present invention.

In FIG. 14, for simplification, the number of the control node 90 is made one and the number of the controlled nodes is also made one, thereby giving an example of one-to-one optical communication, however, the invention can be applied to one-to-many optical communication as well.

Further, in FIG. 14, components of the same configuration as the components of the control node 90 and the controlled node 100 in FIG. 1 are given the same reference numerals and explanations of identical components are omitted.

An amount information generation means 66B in the MPU 66 has almost the same configuration as the amount information generation means 60B in the MPU 60 in FIG. 1, and an assignment means 36A in the MPU 36 in FIG. 14 has almost the same configuration as the assignment means 30A in the MPU 30 in FIG. 1.

The configuration node 390 comprises a transmission device 10, a reception device 20, an MPU 36, a switch 31, and a signal conversion circuit 32.

The MPU 36 comprises an assignment means 36A and a light emission control means 36B.

The assignment means 36A assigns time slots, generates assignment information, and outputs an enabling signal indicating the assignment information as a signal S7 to the signal conversion circuit 32.

The light emission control means 46B generates a light emission control signal S18 for suspending the light emission by the transmission device 10 for a predetermined period and outputs it to a light emission control terminal 12T of the light emission circuit 12.

Also, the light emission control means 36B generates light emission suspension information including information indicating the light emission by the light emission circuit 12 and the light emission restarting time S and outputs the same as a signal S7 to the signal conversion circuit 32.

The controlled node 300 comprises a transmission device 40, a reception device 50, an MPU 66, a switch 61, and a signal conversion circuit 62.

The MPU 66 comprises a light emission control means 66A and an amount information generation means 66B.

The light emission control means 66A generates a light emission control signal S16 for continuing the light emission by the light emission circuit 42 and outputs it to the light emission control terminal 42T of the light emission circuit 42.

The amount information generation means 66B monitors the input data S25 to generate amount information of the input data S25 and outputs the same as a signal S26 to the signal conversion circuit 62.

The assignment means 36A included in the MPU 36 of the control node 390 assigns time slots after N cycles (N≧1) based on the instruction signal S22 input to the terminal 92 from an outside device, for example, an upper layer, and output data S20 and outputs a signal S7 indicating the assignment information to the signal conversion circuit 32.

Also, the light emission control means 36B generates light emission suspension information including information instructing stopping of the light emission by the light emission circuit 12 and information instructing the light emission restarting time S and outputs the same as a signal S7 to the signal conversion circuit 32.

The signal S7 is converted to a signal S9 of a format for infrared communication, while the signal S9 is supplied to one switchable terminal a of the switch 31.

The switch 31 receives a transfer block or a control block as a signal S6 from the signal conversion circuit 32 at the other switchable terminal b and controls switching of the switchable terminals a and b based on the switch control signal S8 from the MPU 36.

When transmitting a normal transfer block, the MPU 36 controls the switching of the switch 31 to the switchable terminal b side by the switch control signal S8 so that the signal S6 of the transfer block is sent as it is as a signal S1 to the transmission device 10.

When transmitting a control block, the MPU 36 controls the switching of the switchable terminals a and b of the switch 31 by the switch control signal S8 so that a signal S9 is inserted to part of the control block. Here, the switch 31 operates as a multiplexer. As a result, a transmission signal S1 having the configuration as shown in the above FIG. 20 wherein the signal S9 is inserted to part of the signal S6 of the control block is generated.

At this time, the signal S9 inserted to the control block is a signal indicating time slot assignment information after N cycles and approval of time slots and is a signal indicating light emission suspension information.

On the other hand, the light emission control means 66A in the MPU 66 of the controlled node 400 is supplied with output data S23 from the signal conversion circuit 62 and detects a control block in the output data S23.

The amount information generation means 66B in the MPU 66 generates amount information of input data S25, supplies the same to the light emission control means 66A, and further outputs the amount information as a signal S26 to the signal conversion circuit 62.

The MPU 66 is supplied with a control block transferred from the control node 390, detects the enabling signal and the light emission suspension information in the control block, and outputs predetermined data as a signal S26 to the signal conversion circuit 62 when data transmission is necessary.

The signal conversion circuit 62 converts the signal S26 to a signal S27 of a format for infrared communication and supplies the signal S27 to one switchable terminal a of the switch 61.

The switch 61 receives a transfer block from the signal conversion circuit 62 as a signal S28 at the other switchable terminal b and switches the switchable terminals a and b based on the switch control signal S29 from the MPU 66.

The MPU 66 switches the switch 61 by the switch control signal and inserts the signal S27 to part of the transfer signal S28. A transmission signal S11 of the transfer block is output from the switch 61 to the transmission device 40.

Operation of Controlled Node 400

The operation of the controlled node 400 will be explained with reference to FIG. 15 next.

Figure 15:
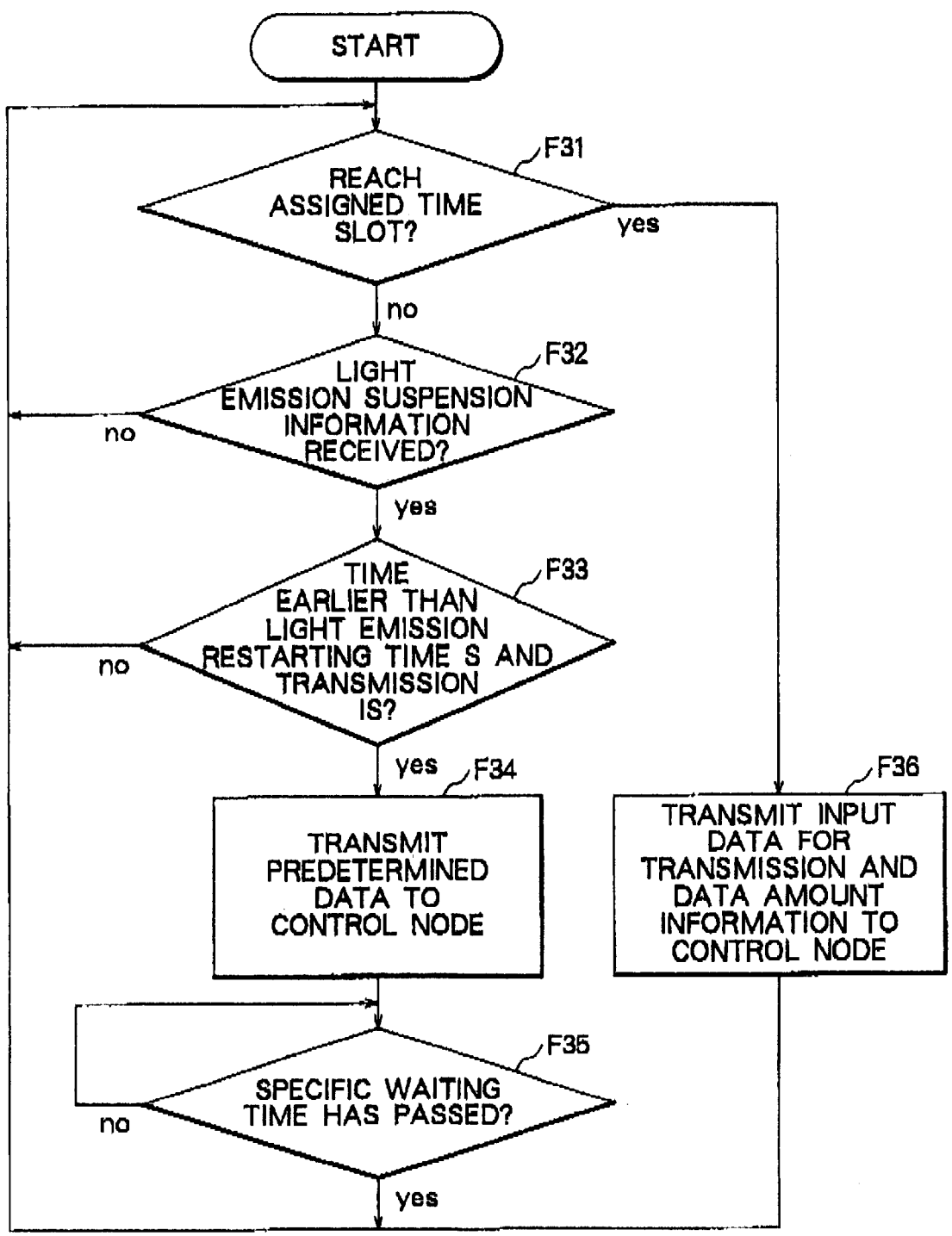
FIG. 15 is a schematic flow chart of the operation of a controlled node and the control operation of an MPU.

FIG. 15 is a schematic flow chart of the operation of the controlled node 400 and the control operation of the MPU 66. Here, the control operation relating to light emission suspension information from the control node 390 is shown.

First, at step F31, it is judged whether a time slot is assigned to the controlled node 400 based on a transmission enabling signal in the output data S23. When the assigned time slot arrives, the routine proceeds to step F36.

When the assigned time slot does not arrive, the routine proceeds to step F32.

At step F32, it is judged whether light emission suspension information including information indicating suspension of the infrared ray emission and information indicating a light emission restarting time S is received. Specifically, this is judged by whether any light emission suspension information is detected in the output data S23.

When the light emission suspension information is not received, the routine returns to step F31.

When the light emission suspension information is received, the routine proceeds to step F33.

At step F33, it is judged whether the current time is earlier than the light emission restarting time S and whether a requirement for data transmission has occurred. The case where a requirement for a data transmission has occurred is for example when the amount of the input data S25 sharply increases and exceeds a predetermined data amount.

When the current time is not earlier than the light emission restarting time S or when the requirement for data transmission has not occurred, the routine returns to step F31.

When the current time is earlier than the light emission restarting time S and data transmission is required, the routine proceeds to step F34.

At step F34, a transfer block including predetermined data is transmitted to the control node 90 using the assigned time slot, then the routine proceeds to step F35.

Specifically, by outputting the signal S26 indicating the predetermined data to the signal conversion circuit 62 to convert it to the signal S27 and by controlling the switching of the switch 61 by the switch control signal, the signal S27 is inserted to part of the signal S28 of the transfer block and the transmission signal S11 is generated. When the control node 390 receives the predetermined data, the light emission control means 36B of the control node 390 is made to generate the light emission control signal S18 and the light emission circuit 12 is made to start emitting light.

At step F35, it is judged whether a waiting time specifically for the controlled node 400 has passed from the predetermined data transmission in the above step F34. Note that when a wireless optical communication system has a plurality of controlled nodes, by setting the waiting times so that cycles for transmitting predetermined data by the plurality of controlled nodes become mutually different, it becomes possible to transmit the predetermined data at different times when the plurality of controlled nodes are simultaneously required for data transmission.

When the specific waiting time has not passed, it is waited until the time elapses.

When the specific waiting time has passed, the routine returns to step F31.

Operation of Control Node 390

The operation of the control node 390 will be explained with reference to FIG. 16 and FIG. 17 next.

Figure 16:
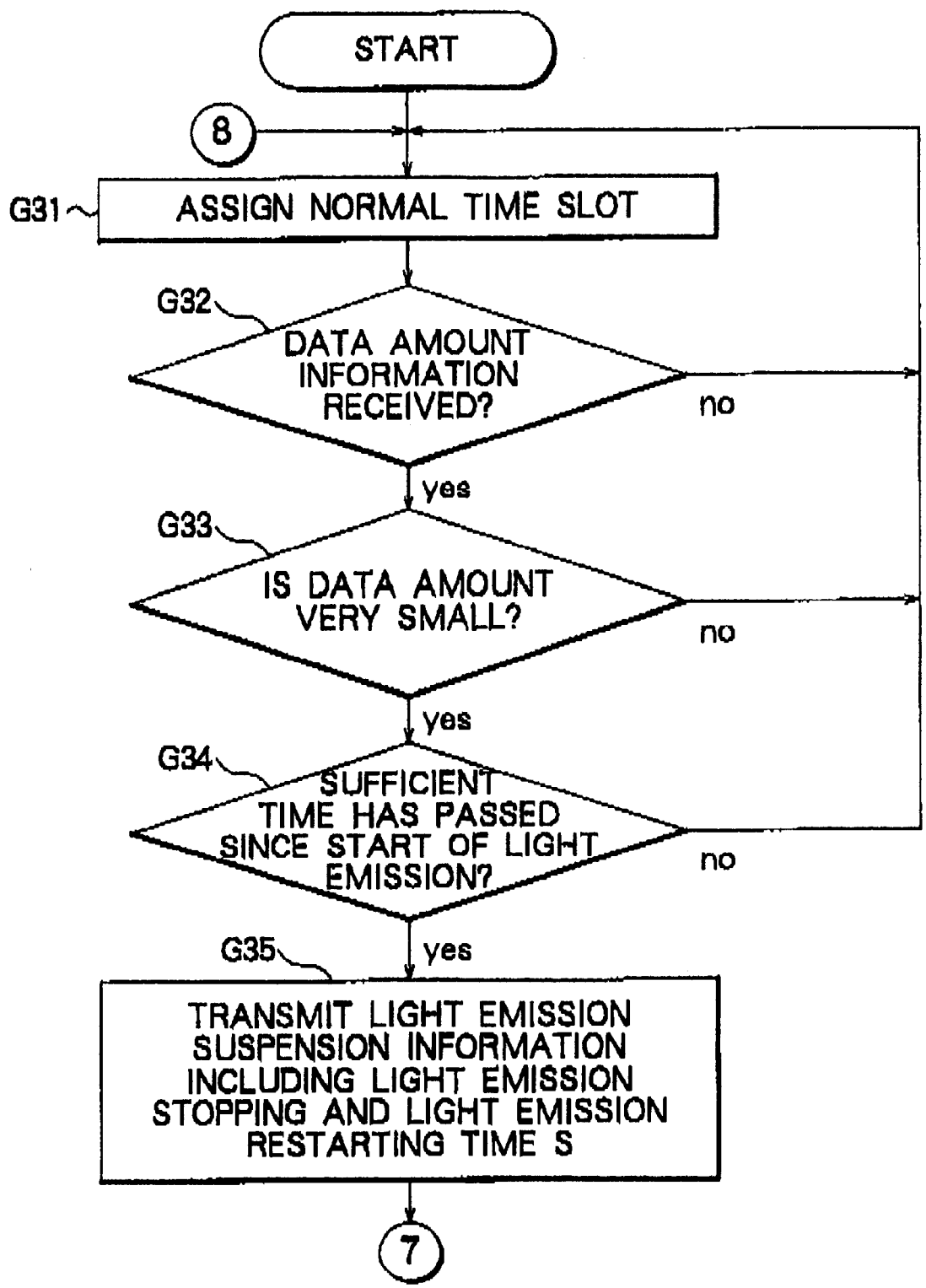
FIG. 16 is a schematic flow chart of the operation of a control node and the control operation of an MPU.
Figure 17:
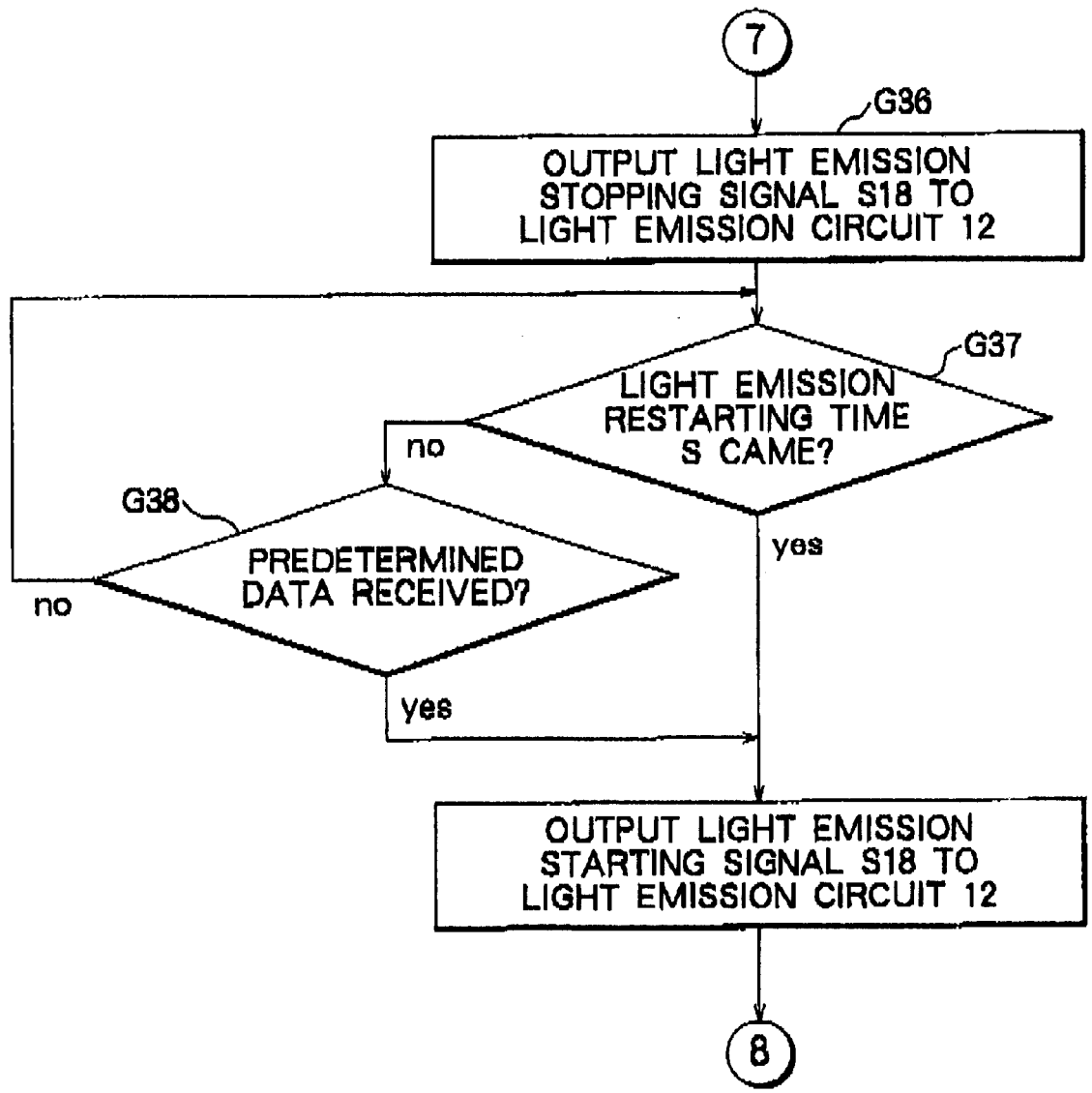
FIG. 17 is a schematic flow chart of the operation of a control node and the control operation of an MPU continued from FIG. 16.

FIGS. 16 and 17 are schematic flow charts of the operation of the control node 390 and the control operation of the MPU 36. Here, the control operation relating to time slots assignment is shown. Also, the optical communication system will be explained for a case where there are one control node 390 and three controlled nodes 400A to 400C.

First, at step G31, time slots are normally assigned, then the routine proceeds to step G32. For example, the control node 390 normally assigns time slots by equally assigning time slots to the control node 390 and the controlled nodes 400A to 400C.

At step G32, it is judged whether the amount information of the input data S25 is received by referring to the output data from the signal conversion circuit 32.

When the amount information is not received, the routine returns to step G31.

When the amount information is received, the routine proceeds to step G33.

At step G33, it is judged whether the data amount of the input data S25 and that of the input data S21 to the controlled nodes 400A to 400C are very small. For example, when the data amounts of the input data S25 and input data S21 are smaller than a predetermined data amount, it is judged the data amount is very small, while when the data amount of the input data S25 or input data S21 exceeds the predetermined data amount, it is judged that the data amount is not very small.

When it is judged to be not very small, the routine returns to step G31, where time slots are normally assigned. Here, when the data amount of the input data S21 exceeds the predetermined data amount, a transfer block including the input data S21 is transferred to the controlled nodes 400A to 400C in the time slot assigned to the node 390.

When it is very small, the routine proceeds to step G34.

At step G34, it is judged whether a sufficient time has passed since the light emission circuit 12 started light emission.

When a sufficient time has not yet passed, the routine returns to step G31.

When the sufficient time has passed, the routine proceeds to step G35.

At step G35, light emission suspension information including information indicating light emission suspension and information indicating the light emission restarting time S is generated and transmitted to the controlled nodes 400A to 400C by using the control block.

At step G36, a light emission control signal S18 for stopping the light emission is generated to instruct the light emission circuit 12 to suspend light emission suspension, then the routine proceeds to step G37. The light emission circuit 12 stops emitting the light based on the light emission suspension signal S18.

Note that at step G36, a time slot may be assigned to the node 390 and the light emission suspension signal S18 may be output to the light emission circuit 12 in the assigned time slot.

At step G37, it is judged whether the current time is the light emission restarting time S.

When the light emission restarting time S, the routine proceeds to step G39.

When not yet the light emission restarting time, the routine proceeds to step G38.

At step G38, it is judged whether predetermined data is received or not. Specifically, this is judged by monitoring the output data S20 from the signal conversion circuit 32 and determining whether the predetermined data is detected in the output data S20.

When the predetermined data is not received, the routine returns to step G37.

When the predetermined data is received, the routine proceeds to step G39.

At step G39, a light emission control signal S18 for starting the light emission is generated to instruct the light emission circuit 12 to start emitting the light, then the routine returns to step G31. The light emission circuit 12 starts the light emission based on the light emission starting signal S18.

In the control node 390, the MPU 66 may be configured to generate amount information of the input data S21 by monitoring the input data S21 or configured to be supplied with amount information of the input data S21 as a signal S22 via a terminal 92.

The controlled node 400 was configured so that the light emission circuit 42 constantly emits light, however, it may also be configured so that the light emission by the light emission circuit 42 may be suspended for a predetermined period based on the data amount of the input data S25.

Also, in the optical communication system of the third embodiment, in the control node 290, infrared ray emission may be stopped and started instantaneously as shown in FIGS. 5 and 6. It is also possible to give a gradual transient property of an extent able to fit in an assigned time slot or of about one cycle and use this to change the infrared ray from a predetermined signal intensity to zero signal intensity or from the zero signal intensity to a predetermined signal intensity as shown in FIG. 7.

By stopping and starting the light emission by a timing, pattern, or transient property so that the modulated signal component in the sub-carrier frequency band of, for example, not more than 33 kHz and less than 6 MHZ, becomes under the maximum allowable value in this way, it becomes possible to suppress the modulated signal component in the sub-carrier frequency band generated by the stopping and starting of light emission and thereby reduce the spurious waves and possible to shorten the period from the stopping of the light emission to the starting of the light emission or from the starting of the light emission to the stopping of the light emission.

Further, as shown in FIG. 8, it is possible to transmit a reference signal in the same time slot SL121 at the time of restarting the emission of the infrared ray to make the preparations for reception (amplitude adjustment, synchronization adjustment, etc.) of the control node 390 for data to be transmitted from the controlled node 400 in the time slot SL.

In the optical communication system of the above third embodiment, an example was explained where the emission of an infrared ray were stopped and started in an assigned time slot.

However, it is also possible to providing a non-communication period (gap) between time slots and stop and start the infrared ray emission during the non-communication period rather than in the time slot.

In this case, it becomes possible to increase the number of time slots able to be used for data transfer comparing with the case of stopping and starting the light emission in a time slot, thus it is possible to prevent waste of the time slots.

Note that it is also possible to stop the light emission in a gap and start the light emission in an assigned slot or stop the light emission in an assigned time slot and start the light emission in a gap.

Also, the optical communication system of the third embodiment was configured so that the control node 390 transmitted light emission suspension information to the controlled node 400, however, it may also configured so that a plurality of patterns of different light emission suspension periods are registered in the controlled node 400 and selection information indicating which pattern to selected is transmitted to the controlled node 400.

Note that in the control nodes 90, 290, and 390, the signal conversion circuits 32 may be respectively provided in the MPUs 30, 34, and 36, while in the controlled nodes 100, 300 and 400, the signal conversion circuits 62 may be respectively provided in the MPUs 60, 64, and 66.

Also, the switches 31 and 61 may be configured by multiplexers.

Also, the quadrature modulation circuits 11 and 41 may have quadrature amplitude modulation (QAM) type modulators using changes of phases and amplitudes, while the quadrature demodulation circuits 22 and 52 may have QAM demodulators.

Note that the signal conversion circuits 32 and 62 may have error correction circuits.

Also, the frequency band of the carrier modulated signal may be larger than 6 MHZ and smaller than 60 MHZ or larger than 6 MHZ and smaller than 50 MHZ.

Also, the maximum allowable value may be determined, when an infrared communication device is placed near the control node or controlled node which suspends the light emission for a predetermined period, by measuring in advance a value of the modulated signal component in the sub-carrier frequency band used by the infrared communication device in the modulated signal components carried by the infrared ray from the control node or the controlled node which does not cause interference with the infrared communication device and by using the measured value as the maximum allowable value or, when there are laws, regulations, or other conventions, by setting the maximum allowable value by the conventions.

In the optical communication system according to the above embodiments, by stopping and starting the light emission by a timing, pattern, or a transient property so that no serious spurious wave is caused as a result of an increase of a modulated signal component in the sub-carrier frequency band of not less than 33 kHz and less than 6 MHZ, it is possible to prevent interference with remote controls, cordless headphones, and other existing infrared communication devices and to shorten the period of the light emission and thereby reduce the power consumption for the light emission.

Also, by the control nodes 90 and 290 assigning time slots which had been planned to be assigned to controlled nodes suspending light emission to other nodes, the amount of communication of the other nodes can be increased. Further, by assigning the time slots to third controlled nodes not participating in the optical communication, the number of controlled nodes participating in optical communication can be increased.

Summarizing the effects of the invention, in the first optical communication system according to the present invention, the light emission of a transmission means of a second node can be suspended for a predetermined period in accordance with a data amount of input data for transmission input to the second node and therefore the power consumption for light emission by the transmission means can be reduced.

Furthermore, the modulated signal component of a second frequency band generated by stopping and starting the light emission in the modulated signal components carried by the modulated wave, that is, light, from the second node can be suppressed so as to not exceed a maximum allowable value.

Especially, when supposing the light is an infrared ray and the second frequency band is a sub-carrier frequency band used by other infrared communication devices, the modulated signal component in the sub-carrier frequency band can be suppressed to avoid interference with the other infrared communication devices.

In the second optical communication system according to the present invention, it is possible to suspend the light emission for a predetermined period by a transmission device of a second node in accordance with a data amount of input data for transmission input to the second node and therefore reduce the power consumption for the light emission by the transmission means.

Also, since instruction information for suspending the light emission of the second node for a predetermined period is generated in a first node, processing for transmitting to the first node the information indicating the suspension of the light emission by using an assigned time slot can be made unnecessary in the second node.

Also, it is possible to suppress the modulated signal component of a second frequency band generated by the stopping and starting of the light emission in the modulated signal components carried by the modulated wave, that is, light, from the second node so as not to exceed a maximum allowable value.

Especially, when supposing the light is an infrared ray and the second frequency band is a sub-carrier frequency band used by other infrared communication devices, the modulated signal component in the sub-carrier frequency band can be suppressed to prevent interference with the other infrared communication devices.

In the third optical communication system according to the present invention, it is possible to suspend a light emission by the first transmission means for a predetermined period based on the data amount of input data for transmission input to the first node and the data amount of the input data for transmission input to the second node and thereby reduce the power consumption for the light emission by the first transmission means.

Further, it is possible to suppress the modulated signal component of a second frequency band generated by stopping and starting of the light emission in the modulated signal components carried by the modulated wave, that is, light, from the first node so as not to exceed a maximum allowable value.

Especially, when supposing the light is an infrared ray and the second frequency band is a sub-carrier frequency band used by other infrared communication devices, the modulated signal component in the sub-carrier frequency band can be suppressed to prevent interference with the other infrared communication devices.

In the first optical communication method according to the present invention, it is possible to suspend light emission by a second node for a predetermined period in accordance with a data amount of input data for transmission and thereby reduce the power consumption for the light emission by the second node.

Further, it is possible to suppress the modulated signal component of a second frequency band generated by stopping and starting of the light emission in the modulated signal components carried by the modulated wave, that is, light, from the second node so as not to exceed a maximum allowable value.

Especially, when supposing the light is an infrared ray and the second frequency band is a sub-carrier frequency band used by other infrared communication devices, the modulated signal component in the sub-carrier frequency band can be suppressed to prevent interference with the other infrared communication devices.

In the second optical communication method according to the present invention, it is possible to suspend the light emission by a first node for a predetermined period in accordance with a data amount of input data for transmission input to the second node and a data amount of input data for transmission input to the first node and thereby reduce the power consumption for the light emission by the first node.

Also, it is possible to suppress the modulated signal component of a second frequency band generated by the stopping and starting of the light emission in the modulated signal components carried by the modulated wave, that is, light, from the first node so as not to exceed a maximum allowable value.

Especially, when supposing the light is an infrared ray and the second frequency band is a sub-carrier frequency band used by other infrared communication devices, the modulated signal component in the sub-carrier frequency band can be suppressed to prevent interference with the other infrared communication devices.

While the invention has been described with reference to specific embodiment chosen for purpose of illustration, it should be apparent that numerous modifications could be made thereto by those skilled in the art without departing from the basic concept and scope of the invention.

What is claimed is:

1. A wireless optical communication system having a plurality of nodes including a first node and a second node and performing wireless optical communication between said first node and said second node, wherein said second node comprises:

transmission means for transmitting input data for transmission to be input to said second node to said first node by using light amplitude-modulated by a modulated signal of a first frequency band; and light emission control means for suspending light emission by the transmission means for a predetermined period of time based on a data amount of the input data, so that a modulated signal component in a second frequency band other than said first frequency band does not exceed a maximum allowable value.

2. A wireless optical communication system as set forth in claim 1, wherein said optical communication system performs time-division multiplex mode optical communication and said first node comprises:

assignment means for assigning time slots to said plurality of nodes including said first node and said second node and for generating assignment information, transmission means for transmitting said assignment information to at least said second node by using light amplitude-modulated by a modulated signal of said first frequency band; and reception means for receiving light from said second node and extracting therefrom said input data for transmission from said second node;

said second node further comprises reception means for receiving light from said first node and extracting therefrom said assignment information; and the transmission means of said second node transmits the input data for transmission to be input to said second node to said first node by using said light in a time slot assigned to the second node.

3. The wireless optical communication system as set forth in claim 1, wherein said light emission control means suspends the light emission by said transmission means for the predetermined period of time when a data amount of the input data for transmission to be input to said second node is less than a predetermined data amount.

4. The wireless optical communication system as set forth in claim 1, wherein said light emission control means generates light emission suspension information indicating a timing pattern and transient property for stopping and starting of light emission before the transmission means of said second node stops the light emission; and the transmission means of said second node transmits said light emission suspension information to said first node by using said light prior to stopping of the light emission.

5. A wireless optical communication system as set forth in claim 2, wherein said assignment means reduces the assigning of the time slots to said second node in a suspended period of time where the transmission means of said second node suspends light emission to be less than assigned outside a suspended period or eliminates the assigning of time slots to said second node during said suspended period.

6. The wireless optical communication system as set forth in claim 5, wherein said assignment means assigns time slots not assigned to said second node during said suspended period of time to nodes other than said second node among said plurality of nodes.

7. The wireless optical communication system as set forth in claim 5, wherein:

said assignment means assigns time slots not assigned to said second node during said suspended period of time to those of said plurality of nodes other than said first node and said second nodes yet to participate in the optical communication.

8. The wireless optical communication system as set forth in claim 2, wherein the transmission means of said second node stops the light emission in a time slot assigned to the second node.

9. The wireless optical communication system as set forth in claim 2, wherein the transmission means of said second node starts the light emission in a time slot assigned to the second node.

10. The wireless optical communication system as set forth in claim 9, wherein the reception means of said first node prepares for reception of data from the transmission means of the second node in the time slot where the transmission means of said second node starts the light emission.

11. The wireless optical communication system as set forth in claim 2, wherein
a non-communication period of time is provided between the time slots assigned by said assignment means, and the transmission means of said second node stops the light emission in said non-communication period.

12. The wireless optical communication system as set forth in claim 2, wherein
a non-communication period is provided between the time slots assigned by said assignment means, and said second transmission means starts the light emission in said non-communication period.

13. wireless optical communication system as set forth in claim 2, wherein
the transmission means of said first node transmits at least to said second node the input data for transmission to be input to the first node in a time slot assigned to the first node by using said light.

14. The wireless optical communication system as set forth in claim 1, wherein
said second node further comprises reception means for receiving light from said first node and for extracting from the light data from said first node.

15. The wireless optical communication system as set forth in claim 1, wherein said light is an infrared ray.

16. wireless optical communication system as set forth in claim 15, wherein
said first frequency band is not less than 6 MHZ and less than 60 MHZ, and
said second frequency band is not less than 33 kHz and less than 6 MHZ.

17. A wireless optical communication method for performing wireless optical communication at least between a first node and a second node among a aplurality of nodes, including the steps of:
transferring input data for transmission to be input to said second node from the second node to said first node by using light amplitude-modulated by a modulated signal of a first frequency band;
detecting a data amount of the input data for transmission to be input to said second node; and
suspending light emission by said second node for a predetermined period of time based on said detected data amount so that a modulated signal component in a second frequency band other than said first frequency band does not exceed a maximum allowable value.

18. The wireless optical communication method as set forth in claim 17, wherein time-division multiplex mode optical communication is performed in the optical communication method and further including the steps of:
assigning time slots to said plurality of nodes in said first node;
generating assignment information in said first node;
transferring said assignment information from said first node to at least said second node by using light amplitude-modulated by a modulated signal of said first frequency band, and wherein
the input data for transmission to be input to said second node is transferred to said first node in a time slot assigned to the second node in said step of transferring input data to the first node.

19. The wireless optical communication method as set forth in claim 17, wherein in said step of suspending light emission by the second node for a predetermined time light emission is stopped and started when said detected data amount is less than a predetermined data amount.

20. The wireless optical communication method as set forth in claim 18, wherein
in the step of generating assignment information in said first node assignment of time slots to said second node in a predetermined period of time where said second node suspends the light emission is reduced from assignment outside the predetermined period of time or assignment of time slots to said second node in the predetermined period is eliminated.

21. The wireless optical communication method as set forth in claim 20, wherein
in the step of generating assignment information in said first node time slots not assigned to said second node in said predetermined period are assigned to nodes other than said second node among said plurality of nodes.

22. The wireless optical communication method as set forth in claim 20, wherein
the step of generating assignment information in said first node assigns time slots not assigned to said second node in said predetermined period to those of the plurality of nodes other than said first node and said second node yet to participate in the optical communication.

23. The wireless optical communication method as set forth in claim 18, wherein:
the step of suspending light emission by said second node for a predetermined period of time includes the step of stopping the light emission in a time slot assigned to the second node.

24. The wireless optical communication method as set forth in claim 18, wherein
the step of suspending light emission by said second node for a predetermined period includes the step of starting the light emission in a time slot assigned to the second node.

25. The wireless optical communication method as set forth in claim 24, comprising the further step of
performing preparations for receiving data in said first node from said second node in said time slot wherein said second node starts the light emission.

26. The wireless optical communication method as set forth in claim 18, comprising the further step of
providing a non-communication period between the time slots assigned by said first node; and
the step of suspending the light emission by said second node for a predetermined period of time includes the step of stopping the light emission in said non-communication period.

27. The wireless optical communication method as set forth in claim 18, comprising the further step of
providing a non-communication period between the time slots assigned by said first node; and
the step of suspending the light emission by said second node for a predetermined period of time includes the step of starting the light emission in said non-communication period.

28. The wireless optical communication method as set forth in claim 17, wherein said light is an infrared ray.

29. The wireless optical communication method as set forth in claim 28, wherein
said first frequency band is not less than 6 MHZ and less than 60 MHZ, and said second frequency band is not less than 33 kHz and less than 6 MHZ.

30. A wireless optical communication system having a plurality of nodes including a first node and a second node and performing wireless optical communication between said first node and second node, wherein said first node comprises:
   first reception means for receiving light from said second node and extracting from the light data from said second node;
   instruction information generation means for generating instruction information to stop light emission by said second node for a predetermined period of time based on amount information in said data extracted in said first reception means; and
   first transmission means for transmitting said instruction information to said second node by using light amplitude-modulated by a modulated signal of a first frequency band; and
said second node comprises:
   reception means for receiving light from said first node and extracting from the light said instruction information;
   amount information generation means for generating amount information of input data for transmission to be input to said second node;
   second transmission means for transmitting said amount information generated by said amount information generation means to said first node by using light amplitude-modulated by a modulated signal of said first frequency band; and
   light emission control means for suspending light emission by said second transmission means based on said instruction information extracted by said second reception means so that a modulated signal component in a second frequency band other than said first frequency band does not exceed a maximum allowable value.

31. The wireless optical communication system as set forth in claim 30, wherein said optical communication system performs time-division multiplex mode optical communication and said first node further comprises an assignment means for assigning time slots to said plurality of nodes and generating assignment information;
   said first transmission means transmits to said second node said instruction information and said assignment information by using said light;
   said second reception means receives light from said first node and extracts from the light said instruction information and said assignment information; and
   said second transmission means transmits to said first node the input data for transmission to be input to said second node and said amount information in a time slot assigned to said second node by using said light.

32. The wireless optical communication system as set forth in claim 31, wherein
   said assignment means reduces the assigning of time slots to said second node in a suspended period of time where the transmission means of said second node suspends light emission to be less than the assignment outside the suspended period or eliminates assignment of time slots to said second node during said suspended period.

33. The wireless optical communication system as set forth in claim 32, wherein
   said assignment means assigns time slots not assigned to said second node during said suspended period to nodes other than said second node among said plurality of nodes.

34. The wireless optical communication system as set forth in claim 32, wherein
   said assignment means assigns time slots not assigned to said second node during said suspended period to said plurality of nodes other than said first node and said second node yet to participate in the optical communication.

35. The wireless optical communication system as set forth in claim 31, wherein
   the second transmission means of said second node stops the light emission in a time slot assigned to the second node.

36. wireless optical communication system as set forth in claim 31, wherein
   the second transmission means of said second node starts the light emission in a time slot assigned to the second node.

37. wireless optical communication system as set forth in claim 36, wherein
   the first reception means prepares for reception of data from the second transmission means of the second node in the time slot where the second transmission means starts the light emission.

38. The wireless optical communication system as set forth in claim 31, wherein
   a non-communication period is provided between the time slots assigned by said assignment means, and
   the second transmission means of said second node stops the light emission in said non-communication period.

39. The wireless optical communication system as set forth in claim 31, wherein
   a non-communication period is provided between the time slots assigned by said assignment means, and
   said second transmission means starts the light emission in said non-communication period.

40. The wireless optical communication system as set forth in claim 31, wherein
   the first transmission means of said first node transmits at least to said second node the input data for transmission to be input to the first node in a time slot assigned to the first node by using said light.

41. The wireless optical communication system as set forth in claim 30, wherein
   said instruction information generation means generates said instruction information when a data amount indicated by the amount information in said data is less than a predetermined data amount.

42. The wireless optical communication system as set forth in claim 30, wherein said light is an infrared ray.

43. The wireless optical communication system as set forth in claim 42, wherein
   said first frequency band is not less than 6 MHZ and less than 60 MHZ, and
   said second frequency band is not less than 33 kHz and less than 6 MHZ.

44. A wireless optical communication system having a plurality of nodes including a first node and a second node and performing optical communication at least between said first node and said second node, wherein said first node comprises:
   first transmission means for transmitting to said second node first input data for transmission to be input to said first node by using light amplitude-modulated by a modulated signal of a first frequency band;
   first reception means for receiving light from said second node and extracting from the light data from said second node; and light emission control means for suspending light emission by said first transmission means based on amount information in said data extracted in said first reception means and a data amount of the first input data for transmission to be input to said first nodes so that a modulated signal component in a second frequency band other than said first frequency band does not exceed a maximum allowable value; and said second node comprises:
   amount information generation means for generating amount information of second input data for transmission to be input to said second nodes and
   second transmission means for transmitting said amount information generated by said amount information generation means to said first node by using light amplitude-modulated by a modulated signal of said first frequency band.

45. The wireless optical communication system as set forth in claim 44, wherein said optical communication system performs time-division multiplex optical communication and
   said first node further comprises
      assignment means for assigning time slots to said plurality of nodes and generating assignment information;
      said first transmission means transmits at least to said second node said assignment information by using said light;
      said second node receives light from said first node and extracts from the light said assignment information; and
      said second transmission means transmits to said first node the second input data for transmission input to said second node in a time slot assigned to said second node by using said light.

46. The wireless optical communication system as set forth in claim 44, wherein when said second node needs to transmit said second input data for transmission while in a suspended period where the first transmission means of said first node has suspended the light emission, said second node sends predetermined data to said first node to make said first transmission means to start light emission.

47. The wireless optical communication system as set forth in claim 46, wherein
   said plurality of nodes includes nodes other than said first node and second node; and
   the nodes other than said first node and said second node among said plurality of nodes have mutually different cycles for transmitting said predetermined data.

48. The wireless optical communication system as set forth in claim 44, wherein
   said light emission control means suspends the light emission by said first transmission means for a predetermined period of time when a data amount of the first and second input data for transmission is less than a predetermined data amount.

49. The wireless optical communication system as set forth in claim 44, wherein
   said light emission control means generates light emission suspension information indicating a timing pattern or a transient property for stopping and starting of light emission before the first transmission means stops the light emission; and
   said first transmission means transmits said light emission suspension information to said second node prior to stopping of the light emission.

50. The wireless optical communication system as set forth in claim 44, wherein said light is an infrared ray.

51. The wireless optical communication system as set forth in claim 50, wherein
   said first frequency band is not less than 6 MHZ and less than 60 MHZ, and
   said second frequency band is not less than 33 kHz and less than 6 MHZ.

52. A wireless optical communication method for performing wireless optical communication between a first node and a second node among a plurality of nodes, including the steps of:
   transferring first input data for transmission to be input to said first node from said first node to at least said second node by using light amplitude-modulated by a modulated signal of a first frequency band;
   generating amount information of second input data for transmission to be input to said second node in the second node;
   transferring said amount information from said second node to said first node by using light amplitude-modulated by a modulated signal of said first frequency band; and
   suspending light emission by said first node for a predetermined period of time based on said amount information transferred from said second node and a data amount of the first input data for transmission to be input to said first node, so that a modulated signal component in a second frequency band other than said first frequency band does not exceed a maximum allowable value.

53. The wireless optical communication method as set forth in claim 52, wherein time-division multiplex mode optical communication is performed in the optical communication method and further including the steps of:
   assigning time slots to said plurality of nodes in said first node,
   generating assignment information in said first node; and
   transferring said assignment information from said first node to said second node by using light amplitude-modulated by a modulated signal of said first frequency band; and wherein
   the second input data for transmission and said amount information are transferred from said second node to said first node in a time slot assigned to said second node by using said light in said step of transferring amount information to the first node.

54. The wireless optical communication method as set forth in claim 52, further including the step of,
   when a need arises for transmission of said second input data for transmission in said second node during said predetermined period where light emission by said first node is suspended, transmitting a predetermined data from said second node to said first node to make said first node start light emission.

55. The wireless optical communication method as set forth in claim 54, wherein
   said plurality of nodes includes nodes other than said first nodes and said second node; and
   the nodes other than said first node and said second node among said plurality of nodes have mutually different cycles for transmitting said predetermined data.

56. The wireless optical communication method as set forth in claim 52, wherein
   in said step of suspending, said first node suspends the light emission for a predetermined period of time when a data amount of said first and second input data for transmission is less than a predetermined data amount.

57. The wireless optical communication method as set forth in claim 52, further including the step of generating in said first node light emission suspension information indicating a timing pattern or transient property for stopping and starting light emission before the first node stops the light emission and transferring the timing pattern or transient property to said second node.

58. The wireless optical communication method as set forth in claim 52, wherein said light is an infrared ray.

59. The wireless optical communication method as set forth in claim 58, wherein said first frequency band is not less than 6 MHZ and less than 60 MHZ, and said second frequency band is not less than 33 kHz and less than 6 MHZ.

* * * * *